US012332700B2

(12) United States Patent
Yun et al.

(10) Patent No.: US 12,332,700 B2
(45) Date of Patent: Jun. 17, 2025

(54) FOLDABLE DISPLAY DEVICE

(71) Applicants: LG Display Co., Ltd., Seoul (KR);
Fine M-Tec Co., LTD., Anyang-si (KR)

(72) Inventors: YoungJoon Yun, Goyang-si (KR);
JiSoon Oh, Goyang-si (KR);
Hyeonggwang An, Incheon (KR);
YunMi Lee, Seoul (KR); ShinSuk Lee,
Gimpo-si (KR); SeongYun Jeong,
Goyang-si (KR); ByeongCheol Lee,
Cheongju-si (KR); HyunChan Kim,
Anseong-si (KR); JaeKyu Lee,
Anyang-si (KR)

(73) Assignees: LG DISPLAY CO., LTD., Seoul (KR);
FINE M-TEC CO., LTD., Anyang-si
(KR)

( * ) Notice: Subject to any disclaimer, the term of this patent is extended or adjusted under 35 U.S.C. 154(b) by 203 days.

(21) Appl. No.: 18/087,114

(22) Filed: Dec. 22, 2022

(65) Prior Publication Data
US 2023/0213983 A1    Jul. 6, 2023

(30) Foreign Application Priority Data
Dec. 24, 2021  (KR) .......................... 10-2021-0187510

(51) Int. Cl.
*G06F 1/16*    (2006.01)
(52) U.S. Cl.
CPC .......... *G06F 1/1681* (2013.01); *G06F 1/1616* (2013.01); *G06F 1/1637* (2013.01); *G06F 1/1652* (2013.01)

(58) Field of Classification Search
CPC ......... E05D 3/122; E05D 3/18; G06F 1/1681; G06F 1/1616; G06F 1/1637; G06F 1/1652; H05K 5/0217; H05K 5/0226; F16C 11/04
See application file for complete search history.

(56) References Cited

U.S. PATENT DOCUMENTS

| 2016/0010374 | A1* | 1/2016 | Hsu ..................... G06F 1/1681 74/414 |
| 2021/0034102 | A1* | 2/2021 | Cho ..................... H01F 7/0226 |
| 2021/0294390 | A1* | 9/2021 | Moon .................. G06F 1/1656 |
| 2022/0316559 | A1* | 10/2022 | Jia ......................... G06F 1/1681 |

FOREIGN PATENT DOCUMENTS

| KR | 10-2019-0079033 A | 7/2019 |
| KR | 10-2021-0015468 A | 2/2021 |
| KR | 10-2021-0092862 A | 7/2021 |

* cited by examiner

*Primary Examiner* — Sagar Shrestha
*Assistant Examiner* — Peter Krim
(74) *Attorney, Agent, or Firm* — Birch, Stewart, Kolasch & Birch, LLP

(57) ABSTRACT

A foldable display device can include a first support plate and a second support plate, a display panel disposed on the first support plate and the second support plate, and a hinge assembly disposed between the first support plate and the second support plate. The hinge assembly can include a first hinge arm and a second hinge arm rotatably connected to each other, a first bevel gear and a second bevel gear respectively coupled to the first hinge arm and the second hinge arm, and a first gear arm and a second gear arm fastened to interlock with the first hinge arm and the second hinge arm. The display panel can be folded or unfolded about a rotation axis different from central axes of the first bevel gear and the second bevel gear.

19 Claims, 17 Drawing Sheets

FOLDABLE DISPLAY DEVICE

CROSS-REFERENCE TO RELATED APPLICATIONS

This application claims the benefit of and priority to Korean Patent Application No. 10-2021-0187510 filed on Dec. 24, 2021 in the Republic of Korea, the entire contents of which are hereby expressly incorporated by reference into the present application.

BACKGROUND

Technical Field

The present disclosure relates to a foldable display device, and more particularly, to a foldable display device having a hinge structure allowing for inner folding (e.g., inward folding of the foldable display device, so as to reduce the size of the foldable display device in a longitudinal direction).

Discussion of the Related Art

Recently, portable terminals such as wireless terminals, personal digital assistants (PDAs), portable multimedia players (PMPs), and electronic organizers are being reduced in sizes for portability. However, since users want to be provided with various pieces of information, such as text information, videos, still images, MP3, and games, through a screen (e.g., display unit or display) of the portable terminal, the screen of a display unit is required to be enlarged and greater in size. However, since a reduction in size of the portable terminal leads to a reduction in size of a display screen, there is a limit in satisfying both requirements of a reduced overall terminal size while increasing a size of a screen (e.g., display screen).

As a way to overcome this limit, a flexible display device, such as a bendable display device, a foldable display device, or a roll-slide display device, has recently been developed.

The flexible display device can be implemented by forming a substrate of a plastic material. However, any alternate material can be used as substrate of the flexible display device. Since the flexible display device can be easily carried when folded and can realize (e.g., have) a large screen when unfolded, it can be applied to various fields of application such as televisions and monitors, as well as mobile devices, such as mobile phones, e-books, and electronic newspapers.

SUMMARY OF THE DISCLOSURE

The inventors of the present disclosure have invented a structure in which a mechanism that includes a hinge is used in an area where a display panel is folded, to implement a foldable display device among flexible display devices. However, the inventors of the present disclosure have recognized the fact that when implementing a folding hinge using only a 4-axis gear (e.g., four general gears), it is infeasible to manufacture a set having a small thickness, or in order to implement a small thickness, a gear size gets small, which reduces durability of the gear and increases the changes of the gear being defective.

Accordingly, the inventors of the present disclosure have invented a foldable display device having a new hinge structure that forms a folding trajectory based on a biaxial rotation structure. In addition, the inventors of the present disclosure have invented a new hinge structure of a foldable display device that includes two bevel gears and a link slider structure for synchronous movement between axes of the two bevel gears during biaxial rotation. In particular, in the foldable display device of the present disclosure, a thickness of the foldable display device can be minimized by using two bevel gears instead of four general gears.

Accordingly, an aspect of the present disclosure is to provide a foldable display device having a hinge structure that allows for inner folding (e.g., folding of the foldable display device in half, or folding of the foldable display device about itself), and is capable of securing durability (e.g., having enhanced durability) without increasing the thickness of the foldable display device.

In addition, the inventors of the present disclosure have realized holding force using friction between components constituting a hinge to maintain a specific folding angle of a foldable display device during folding and unfolding operations of the foldable display device. However, the inventors of the present disclosure have recognized that the holding force required for maintaining a specific folding angle of the foldable display device is reduced due to continuous folding and unfolding operations of the foldable display device. In addition, the inventors of the present disclosure have recognized that, unlike a folder phone (e.g., flip phone of folding phone), a foldable display device is heavy and thus requires high holding force.

Accordingly, the inventors of the present disclosure have developed a new structure of a foldable display device capable of maintaining a specific folding angle of the foldable display device by implementing a holding torque and a free stop function by applying a cam structure, where the cam structure includes compression springs.

Accordingly, another aspect of the present disclosure is to provide a foldable display device having a new structure in which, holding force can be permanently implemented without a decrease in holding force, even when the foldable display device is continuously used and high holding force can be implemented even when the foldable display device is heavy.

In addition, the inventors of the present disclosure have recognized that an escape structure is required to realize (e.g., support) a curvature of a display panel (e.g., a curved portion of a display panel) when a hinge is folded, and impact resistance properties are degraded due to the escape structure.

Accordingly, still another aspect of the present disclosure is to provide a foldable display device with improved impact resistance properties while securing an escape space (e.g., supporting space for a curved/folded portion of a display panel) for realizing a curvature of a display panel when folded.

Still another aspect of the present disclosure is to provide a foldable display device having improved usability by removing a space between a display panel and a hinge support using magnetic force.

Objects of the present disclosure are not limited to the above-mentioned objects, and other objects, which are not mentioned above, can be clearly understood by those skilled in the art from the following descriptions.

A foldable display device according to an embodiment of the present disclosure includes a first support plate and a second support plate, a display panel disposed on the first support plate and the second support plate and a hinge assembly disposed between the first support plate and the second support plate, wherein the hinge assembly includes a first hinge arm and a second hinge arm rotatably connected to each other, a first bevel gear and a second bevel gear respectively coupled to the first hinge arm and the second hinge arm in a perpendicular direction, and a first gear arm and a second gear arm fastened to interlock with the first hinge arm and the second hinge arm, wherein the display panel can perform a folding operation and an unfolding operation about a rotation axis different from central axes of the first bevel gear and the second bevel gear.

Other detailed matters of the embodiments are included in the detailed description and the drawings.

According to the present disclosure, impact resistance and durability properties can be improved without an increase in thickness of a foldable display device.

According to the present disclosure, a sufficient holding force for maintaining a specific folding angle of a foldable display can be implemented.

According to the present disclosure, by improving components of a hinge assembly, durability of a foldable display device can be improved without increasing, and while providing reliability of a folding operation of the foldable display device can be secured.

According to the present disclosure, by fixing a display panel during folding, it is possible to prevent reverse folding (e.g., folding in a direction not designed for, folding in a reverse direction, etc.), improve usability, and minimize the occurrence of wrinkles to the display panel of the foldable display device.

The effects according to the present disclosure are not limited to the contents exemplified above, and more various effects are included in the present specification.

BRIEF DESCRIPTION OF THE DRAWINGS

The present disclosure will become more fully understood from the detailed description given hereinbelow and the accompanying drawings which are given by way of illustration only, and thus are not limitative of the present disclosure.

DETAILED DESCRIPTION OF THE EMBODIMENTS

Figure 1:
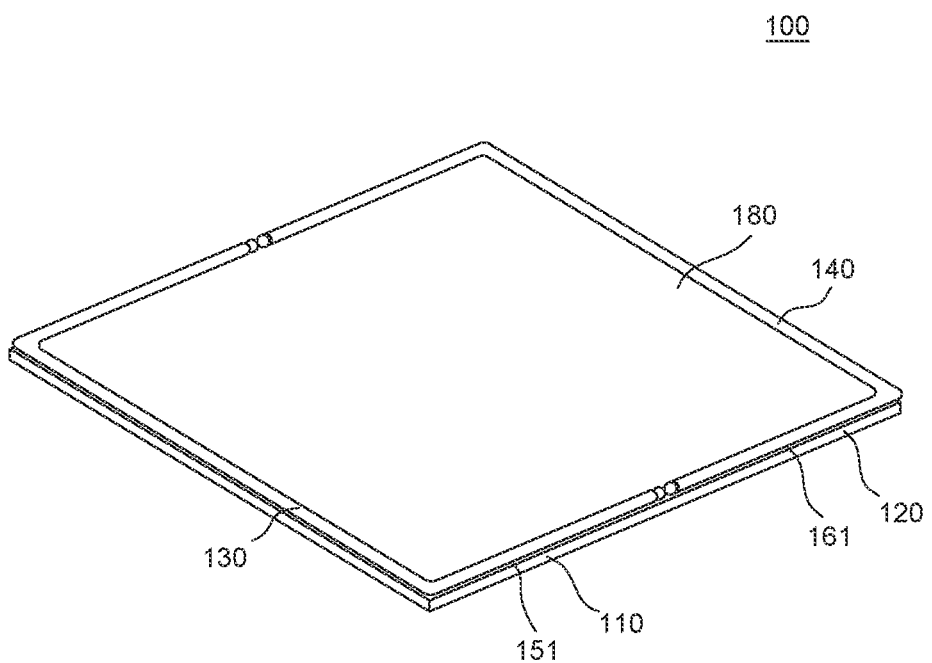
FIG. 1 is a perspective view of a foldable display device according to a first embodiment of the present disclosure.

Advantages and characteristics of the present disclosure and a method of achieving the advantages and characteristics will be clear by referring to embodiments described below in detail together with the accompanying drawings. However, the present disclosure is not limited to the embodiments disclosed herein but will be implemented in various forms. The embodiments are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the specification. Further, in the following description of the present disclosure, a detailed explanation of known related technologies can be omitted to avoid unnecessarily obscuring the subject matter of the present disclosure. The terms such as "including," "having," and "consist of" used herein are generally intended to allow other components to be added unless the terms are used with the term "only". Any references to singular can include plural unless expressly stated otherwise.

Components are interpreted to include an ordinary error range even if not expressly stated.

When the position relation between two parts is described using the terms such as "on", "above", "below", and "next", one or more parts can be positioned between the two parts unless the terms are used with the term "immediately" or "directly".

When an element or layer is disposed "on" another element or layer, another layer or another element can be interposed directly on the other element or therebetween.

Although the terms "first", "second", and the like are used for describing various components, these components are not confined by these terms. These terms are merely used for distinguishing one component from the other components. Therefore, a first component to be mentioned below can be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, various embodiments of the present disclosure will be described in detail with reference to the accompanying drawings. All the components of each display device according to all embodiments of the present disclosure are operatively coupled and configured.

FIG. 1 is a perspective view of a foldable display device according to a first embodiment of the present disclosure.

Figure 2:
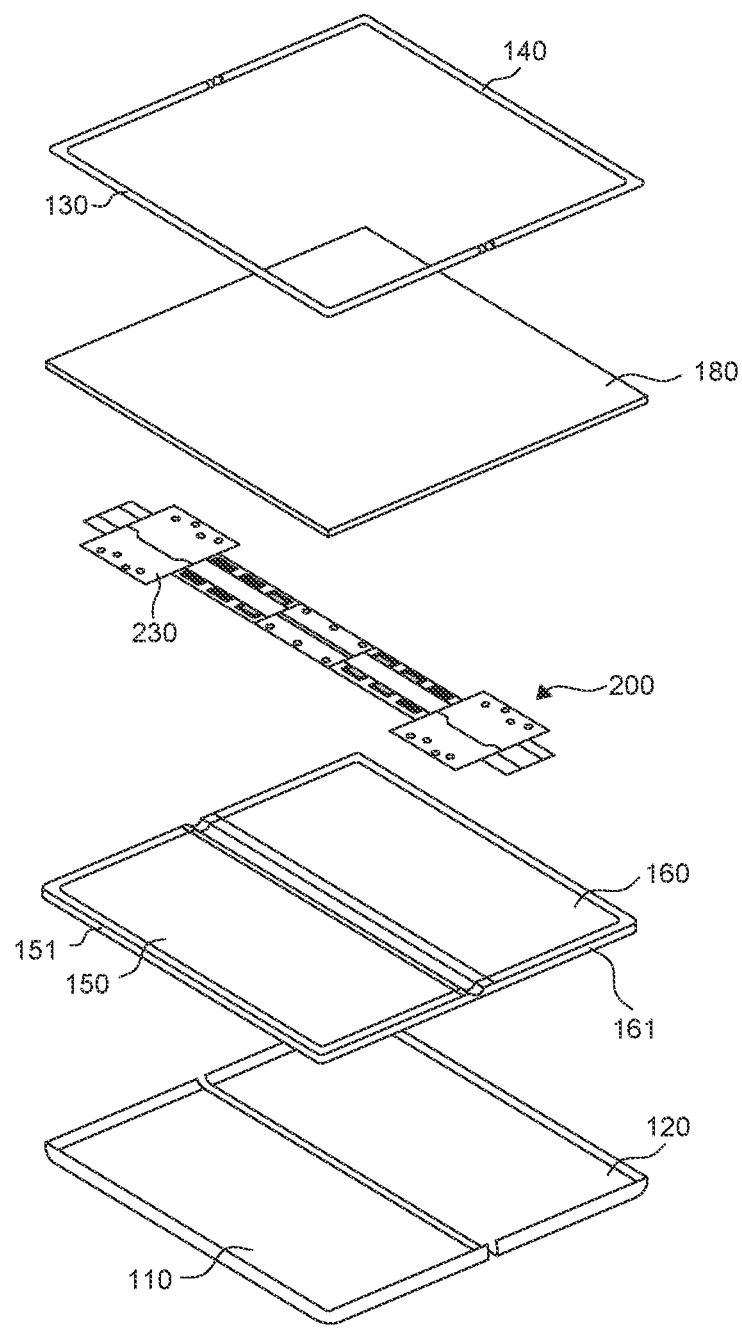
FIG. 2 is a schematic exploded perspective view of the foldable display device according to the first embodiment of the present disclosure.

FIG. 2 is a schematic exploded perspective view of the foldable display device according to the first embodiment of the present disclosure.

Figure 3:
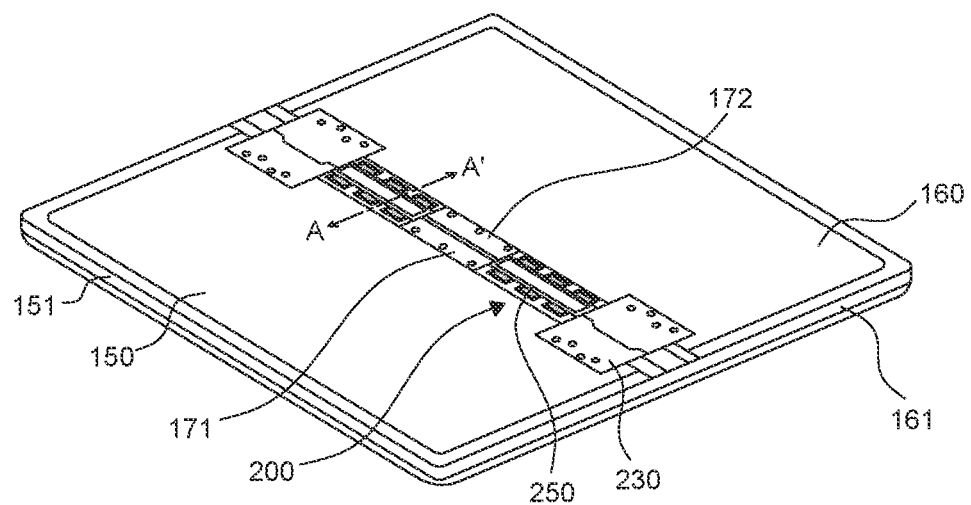
FIG. 3 is a perspective view illustrating a part of a configuration of the foldable display device according to the first embodiment of the present disclosure.

FIG. 3 is a perspective view illustrating a part of a configuration of the foldable display device according to the first embodiment of the present disclosure.

FIG. 3 illustrates components of a foldable display device 100 according to the first embodiment of the present disclosure of FIG. 1 except for a display panel 180 and bezel covers 130 and 140.

Referring to FIGS. 1 to 3, the foldable display device 100 according to the first embodiment of the present disclosure can be configured to include set housings (e.g., housings) 110 and 120, set frames 150, 151, 160 and 161, a hinge assembly 200, the display panel 180, and the bezel covers 130 and 140. The set housings 110 and 120 being spaced from another and being provided on opposing sides of the foldable display device 100.

The foldable display device 100 according to the first embodiment of the present disclosure can further include a hinge support 250 and support covers 171 and 172 provided in the hinge assembly 200.

In FIG. 1, components of the foldable display device 100 are briefly illustrated for convenience of explanation, but substantially, various components for driving the foldable display device 100 can be further included.

The set housings 110 and 120 can be disposed under the display panel 180, under the hinge assembly 200, and under the set frames 150, 151, 160, and 161.

The set housings 110 and 120 are a set of exterior covers, and can include a first cover 110 on a left (e.g., first side) and a second cover 120 on a right (e.g., second side), but the present disclosure is not limited thereto. For instance, additional set housings can be provided, including four separate set housings, or any number of set housings.

The first cover 110 and the second cover 120 can be disposed in one area and the other area in which the foldable display device 100 according to the first embodiment of the present disclosure is folded and unfolded. That is, the first cover 110 and the second cover 120 can be disposed in a first area when the foldable display device 100 is folded (e.g., in the folded state), and the first cover 110 and the second cover 120 can be disposed in a second area when the foldable display device 100 is unfolded (e.g., in the expanded state). In the foldable display device 100 according to the first embodiment of the present disclosure, a folding operation and an unfolding operation are performed by external force that is applied by a user and the folding and unfolding operation is based on a boundary area between the first cover 110 and the second cover 120.

The first cover 110 and the second cover 120 can be provided to have the same shape. Alternatively, the first cover 110 and the second cover 120 can have different shapes.

The set frames 150, 151, 160, and 161 are a set of built-in frames, on which various hardware components of the foldable display device 100 can be mounted and the display panel 180 can be seated. That is, the set frames 150, 151, 160, and 161 can be pre-formed.

To this end, the set frames 150, 151, 160, 161 can include a first support plate 150 on the left and a second support plate 160 on the right, and a first frame 151 on the left and a second frame 161 on the right, but the present disclosure is not limited thereto. However, the first support plate 150 and a second support plate 160 can be in the form of a single unitary member, and this single unitary support plate can include a centrally located groove (e.g., centrally located along a width direction and extending an entire length of the support plate) for housing (e.g., receiving, supporting, etc.) the hinge assembly 200.

The first support plate 150 and the second support plate 160 can be separately provided to be folded independently of each other, and the hinge assembly 200 can be provided therebetween.

The support covers 171 and 172 are disposed on an upper portion of the hinge assembly 200 and provided between the first support plate 150 and the second support plate 160 to cover a central portion of the hinge assembly 200, but the present disclosure is not limited thereto. That is, an area between the first support plate 150 and the second support plate 160 can be provided with a groove (e.g., insertion groove) or indentation to allow for the hinge assembly 200 to be placed (e.g., disposed, fixed, attached, etc.) therein, so that the support covers 171 and 172 can be disposed in the area between the first support plate 150 and the second support plate 160.

The support covers 171 and 172 can include a first support cover 171 on the left and a second support cover 172 on the right, but the present disclosure is not limited thereto.

The first frame 151 and the second frame 161 can be separately provided to be folded independently of each other.

In addition, the first support cover 171 and the second support cover 172 can be separately provided to be folded independently of each other.

The first frame 151 and the second frame 161 can surround and fix edges of the first bezel cover 130 and the first support plate 150 and edges of the second bezel cover 140 and the second support plate 160, respectively.

In this case, the first support plate 150 can include a first fastening unit 152 and the second support plate 160 can include a second fastening unit 162. The first fastening unit 152 and the second fastening unit can be coupled to the hinge assembly 200.

The first support plate 150 and the second support plate 160 can be provided to have the same shape, and the first fastening unit 152 and the second fastening unit 162 can be disposed to face each other and be symmetrical. However, the first support plate 150 and the second support plate 160 can be provided to have different shapes.

A plurality of fastening grooves are formed in each of the first fastening unit 152 and the second fastening unit 162, and a plurality of fastening grooves are formed in one surface (or multiple surfaces) of facing hinge arms 230 of the hinge assembly 200, so that the hinge assembly 200 can be fixed thereto through predetermined fastening elements.

An insertion groove can be formed in a folded portion between the first support plate 150 and the second support plate 160, and a hinge housing of the hinge assembly 200 can be inserted into the insertion groove. Further, the hinge assembly 200 can be substantially flush with the first support plate 150 and the second support plate 160 when installed (e.g., attached, coupled, etc.) onto the insertion groove, which can be accomplished via fasteners through holes provided in the hinge assembly 200. Alternatively, the hinge assembly 200 can be attached to the first support plate 150 and the second support plate 160 by adhesive fastening, brazing, solder, welding and the like.

The foldable display device 100 according to the first embodiment of the present disclosure is characterized in that it is implemented in an inner folding manner in which a screen unit is disposed internally (e.g., the display panel 180/display unit/screen unit is covered by an outer surface of the foldable display device 100 to be hidden from view), when folded.

Meanwhile, the first support plate 150 and the second support plate 160 can be base members for supporting various components of the foldable display device 100, as well as the display panel 180. Also, the first support plate 150 and the second support plate 160 can accommodate various components for driving the foldable display device 100.

The first support plate 150 and the second support plate 160 according to the first embodiment of the present disclosure can be disposed in one area and the other area where the foldable display device 100 is folded and unfolded. That is, the foldable display device 100 can be folded and unfolded at a boundary area between the first support plate 150 and the second support plate 160 due to an external force applied by a user to the foldable display device 100.

The hinge arm 230 can connect the first fastening unit 152 of the first support plate 150 and the second fastening unit 162 of the second support plate 160. In this case, one or more hinge arms 230 of the hinge assembly 200 can be provided in some cases. In FIG. 2, it is illustrated that a pair of the hinge arms 230 are provided on one side and the other side (e.g., opposing sides) of the hinge assembly 200, but the present disclosure is not limited thereto. That is, the hinge arms 230 can be provided at any portion of the hinge assembly 200.

Specifically, the pair of hinge arms 230 can respectively connect opposing sides of the first fastening unit 152 and the second fastening unit 162.

As described above, the hinge assembly 200 can be disposed at a portion of the foldable display device 100 where the foldable display device 100 is folded and unfolded, so that a folding operation and an unfolding operation of the foldable display device 100 can be facilitated. Also, the hinge assembly 200 can provide a predetermined holding force to maintain the foldable display device 100 in a folded state at a specific angle. In this case, the holding force of the hinge assembly 200 can be provided from a cam structure that includes compression springs. A detailed structure and function of the hinge assembly 200 will be described later with reference to FIG. 4 to FIG. 11B.

The display panel 180 can be disposed on one surface of each of the first support plate 150 and the second support plate 160. As the display panel 180, one of various types of display panels can be used, such as an organic light emitting display panel or a liquid crystal display panel.

The display panel 180 is a component to display an image to a user and can include a plurality of sub-pixels (e.g., the display panel 180 can utilize subpixel rendering as a way to increase its resolution). In the display panel 180, a plurality of scan lines and a plurality of data lines can cross each other, and each of the plurality of sub-pixels can be connected to the scan lines and data lines. In addition, each of the plurality of sub-pixels can be connected to a high potential power line, a low potential power line, an initialization signal line, a reset signal line, an emission control signal line, at least one transistor and the like.

The sub-pixels are minimum units constituting a screen, and each of the plurality of sub-pixels can include a light emitting element and a pixel circuit for driving the light emitting element. A plurality of light emitting elements can be defined differently depending on a type of the display panel 180. For example, when the display panel 180 is an organic light emitting display panel, the light emitting element can be an organic light emitting element including an anode, a light emitting unit, and a cathode. Hereinafter, descriptions are made on the assumption that the light emitting element is an organic light emitting element, but a type of the light emitting element is not limited thereto.

The pixel circuit, for instance of an organic light emitting diode (OLED) display device, is a circuit for controlling a driving of the light emitting element. The pixel circuit can include, for example, a plurality of transistors and a capacitor, but is not limited thereto.

Also, the display panel 180 can have flexibility so that it can be folded and unfolded along with folding and unfolding of the foldable display device 100.

The foldable display device 100 can be folded such that the first support plate 150 and the second support plate 160 form a specific (e.g., predetermined) folding angle (e.g., folding angle with respect to each other). That is, in FIGS. 1 and 2, it is illustrated that the first support plate 150 and the second support plate 160 are fully unfolded to have an angle of, for example, 180°, but the foldable display device 100 can be folded at a specific angle. In this case, the display panel 180 disposed on the first support plate 150 and the second support plate 160 can also be folded at a specific angle along with folding of the first support plate 150 and the second support plate 160.

Also, the foldable display device 100 can maintain a specific folding angle by the holding force provided from the hinge assembly 200. That is, the first support plate 150 and the second support plate 160 can be fixed by the hinge assembly 200 while maintaining a specific folding angle. Accordingly, the foldable display device 100 can be folded at a specific angle according to a user's intention (e.g., by a user according to a user's preference), and can maintain a folded state at the specific angle by the holding force of the hinge assembly 200.

The bezel covers 130 and 140 can cover an upper bezel of the display panel 180 on an upper surface of the display panel 180.

The bezel covers 130 and 140 can include a first bezel cover 110 on the left (e.g., first side) and a second bezel cover 120 on the right (e.g., second side), but the present disclosure is not limited thereto.

Meanwhile, the first embodiment of the present disclosure is characterized in that the hinge support 250 can have a "T" shape and can be disposed between a pair of gear arms 240 of the hinge assembly 200. In particular, through an up/down method (e.g., up and down or vertical movement) of the hinge support 250, an escape structure for realizing (e.g., securing/holding) a curvature of the display panel 180 when folded is secured, and at the same time, the gear arms 240 can be supported, thereby improving impact resistance properties of the foldable display device 100.

Hereinafter, a specific structure and function of the hinge assembly 200 including the hinge support 250 will be described in detail with reference to FIG. 4 to FIG. 11A and FIG. 11B.

Figure 4:
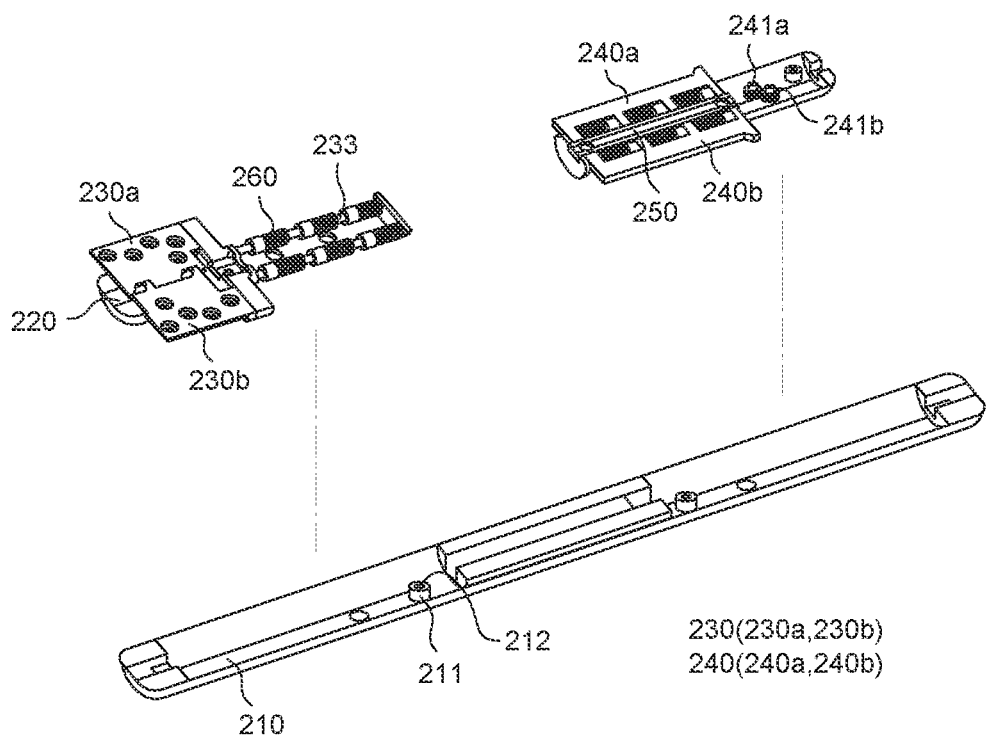
FIG. 4 is an exploded perspective view of a hinge assembly according to the first embodiment of the present disclosure.

FIG. 4 is an exploded perspective view of a hinge assembly according to the first embodiment of the present disclosure.

Figure 5A:
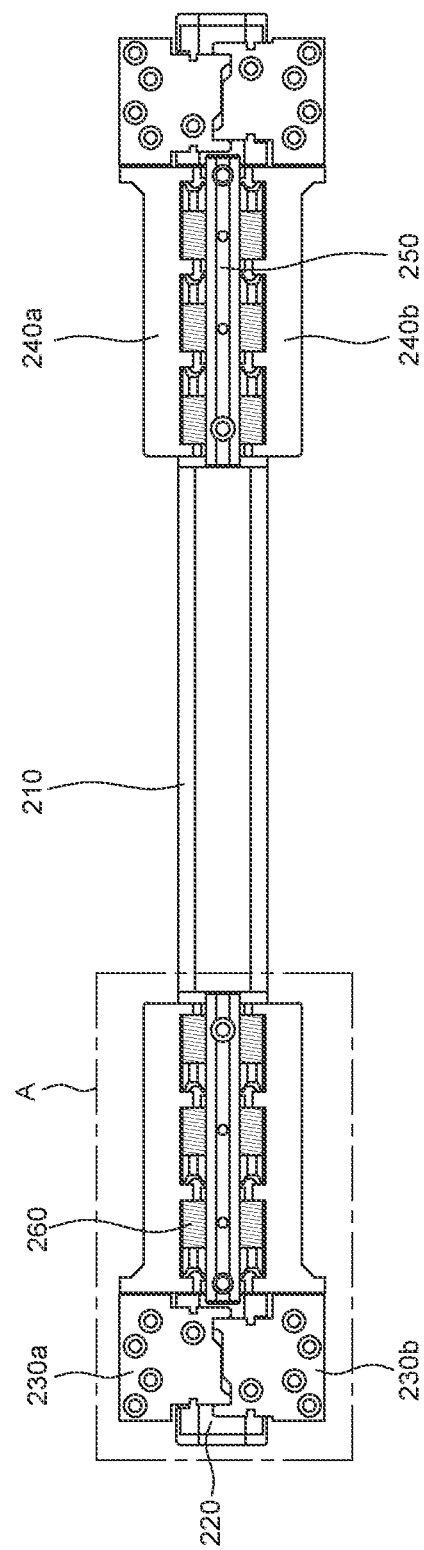
FIG. 5A is a perspective view of the hinge assembly according to the first embodiment of the present disclosure.

FIG. 5A is a perspective view of the hinge assembly according to the first embodiment of the present disclosure.

Figure 5B:
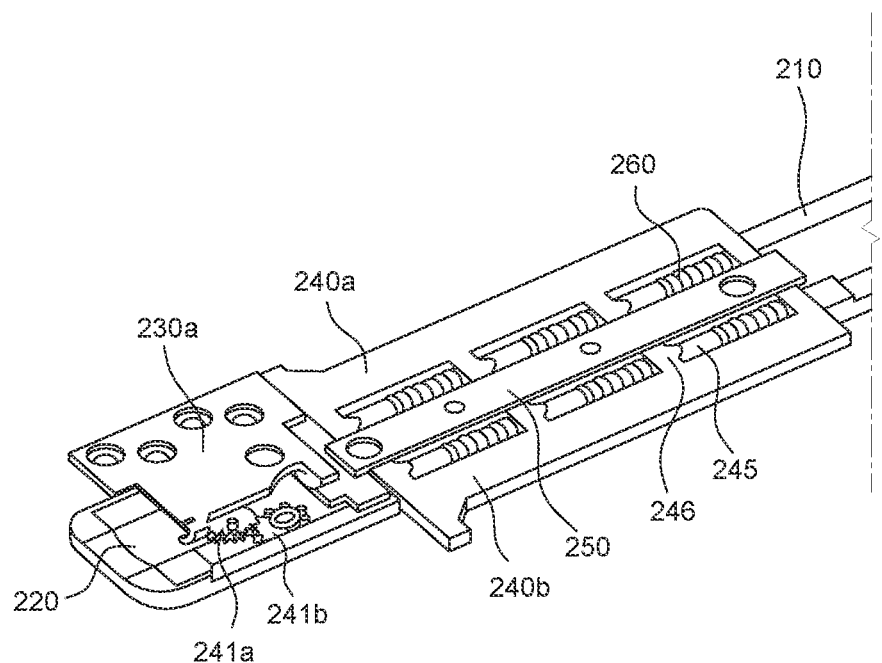
FIG. 5B is an enlarged perspective view of part A of FIG. 5A.

FIG. 5B is an enlarged perspective view of part A of FIG. 5A.

Figure 6A:
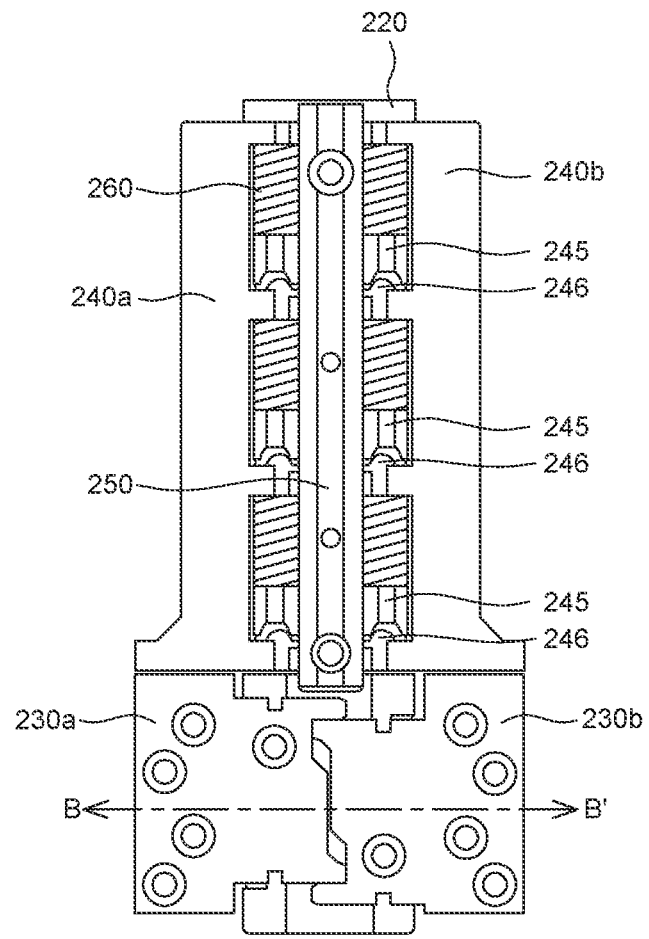
FIG. 6A is a plan view of the hinge assembly according to the first embodiment of the present disclosure.

FIG. 6A is a plan view of the hinge assembly according to the first embodiment of the present disclosure.

Figure 6B:
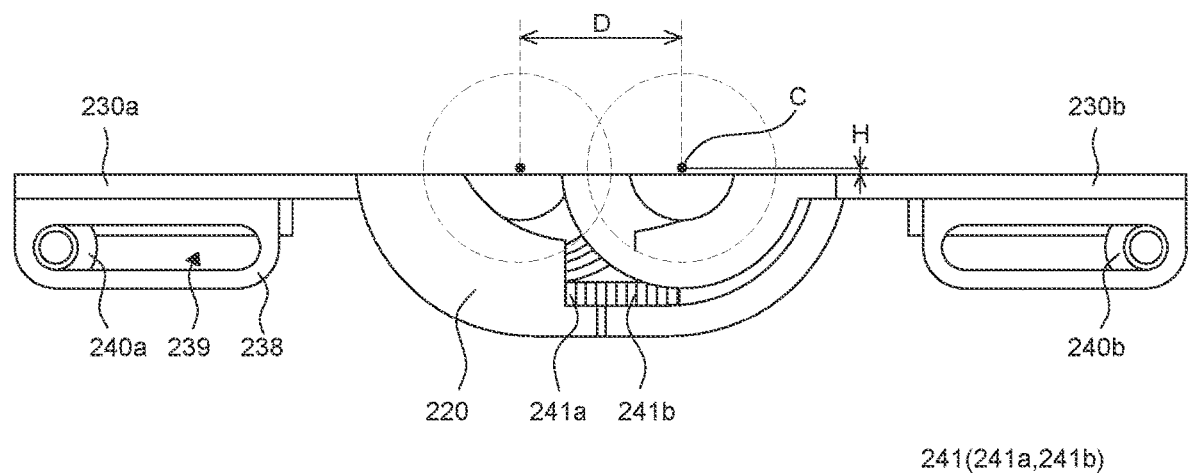
FIG. 6B is a cross-sectional view taken along line B-B' of FIG. 6A.

FIG. 6B is a cross-sectional view taken along line B-B' of FIG. 6A.

In FIG. 4, an illustration of gear arms 240 is omitted from an upper left side, and an illustration of the hinge arms 230 is omitted from an upper right side in order to show internal configurations.

In addition, in FIG. 5B, an illustration of a second hinge arm 230b is omitted to show a pair of bevel gears 241a and 241b, and instead, a first hinge arm 230a is shown. The pair of bevel gears 241a, 241b can include a first bevel gear 241a and a second bevel gear 241b, and the first bevel gear 241a can mesh with the second bevel gear 241b.

Referring to FIG. 4 to FIGS. 6A and 6B, the hinge assembly 200 according to the first embodiment of the present disclosure can be configured to include a hinge housing 210, the pair of hinge arms 230 and an inner frame 220.

In addition, the hinge assembly 200 according to the first embodiment of the present disclosure can further include an upper hinge arm cover fastened at an upper portion of the hinge arm 230 and a lower hinge arm cover fastened a lower portion of the hinge arm 230, but the present disclosure is not limited thereto.

The hinge assembly 200 includes the pair of hinge arms 230 on one side (e.g., lateral side or longitudinal side) thereof, and the pair of hinge arms 230 can be rotatably connected to each other. That is, the hinge arms 230 can include a first hinge arm 230a and a second hinge arm 230b having a symmetrical structure (e.g., symmetrically disposed about the hinge assembly 200), but the present disclosure is not limited thereto.

The first hinge arm 230a and the second hinge arm 230b can have a structure in which they are symmetrical to each other.

The hinge arms 230 according to the first embodiment of the present disclosure is characterized by having a biaxial folding (rotational) structure. That is, when implementing a folding hinge using a 4-axis gear, it is infeasible to manufacture a set (e.g., set of gears), having a small thickness, or in order to implement a small thickness, the size of the gear must be reduced, which reduces durability of the set of gears, which can lead to defects of the gear set. Accordingly, the present disclosure is characterized by the foldable display device 100 having a new hinge structure (e.g., hinge assembly 200) that forms a folding trajectory (or folding path, folding track) (denoted by a dotted line in FIG. 6A) based on a biaxial rotation structure. That is, the present disclosure is characterized by the foldable display device 100 having a biaxial folding hinge structure that can be folded in an inner direction in a foldable product (e.g., so that the foldable display device is folded in half, etc.). In addition, the present disclosure is characterized by a new hinge structure of the foldable display device 100 with two bevel gears 241 (241a and 241b) and a link slider structure for sync between axes during biaxial rotation. The hinge arm 230 is a biaxial folding lever and can be referred to as a lever wing.

The bevel gears 241 can be gears for synchronization of the hinge arm(s) 230 during biaxial folding. Accordingly, the bevel gear 241 can be referred to as a sync gear or sync gears.

The bevel gears 241 can include a first bevel gear 241a coupled to the first hinge arm 230a and a second bevel gear 241b coupled to the second hinge arm 230b.

The first bevel gear 241a and the second bevel gear 241b can have a virtual axis different from a rotation axis C which is an actual axis (e.g., an axis of the gear arms, or a rotation axis of the gear arms). That is, the first bevel gear 241a and the second bevel gear 241b can have a virtual axis substantially perpendicular to the rotation axis C. In other words, the first bevel gear 241a can rotate about a first rotational axis, the second bevel gear 241b can rotate about a second rotational axis, and the first rotational axis and the second rotational axis can be perpendicular third rotational axis of the gear arms 240. The third rotational axis can be rotation axis C shown in FIG. 6B and defined by shafts 233 of the gear arms 240.

Each of a first tooth portion and a second tooth portion formed in the first bevel gear 241a and the second bevel gear 241b can be formed only in a portion of a circumference, but the present disclosure is not limited thereto.

The first bevel gear 241a and the second bevel gear 241b can be disposed to mesh with each other (e.g., directly engage with each other to form a gear mesh, as known in the art). However, the present disclosure is not limited thereto, and the first bevel gear 241a and the second bevel gear 241b can mesh with a first rotation gear and a second rotation gear, respectively, and the first rotation gear and the second rotation gear can be configured to mesh with each other.

Left and right synchronization can be maintained through two sync gears 241 of the present disclosure, that is, the first bevel gear 241a and the second bevel gear 241b.

The first bevel gear 241a and the second bevel gear 241b can include second idle gears that mesh with first idle gears of the respective first hinge arm 230a and the second hinge arm 230b in order to convert and transmit rotation of each of the first hinge arm 230a and the second hinge arm 230b in a perpendicular direction.

In this case, the first idle gear and the second idle gear can be disposed in a substantially perpendicular direction to convert the rotation in the perpendicular direction. That is, each of the first bevel gear 241a and the second bevel gear 241b is rotatably fastened to the first idle gear of each of the first hinge arm 230a and the second hinge arm 230b through the second idle gear. Meanwhile, the first hinge arm 230a and the second hinge arm 230b are slidably fastened to a first gear arm 240a and a second gear arm 240b, respectively, so that a folding operation and an unfolding operation of the foldable display device 100 can be performed while left and right synchronization is maintained. that is, the first hinge arm 230a has synchronous movement with the second hinge arm 230b due to the action of the first gear arm 240a and the second gear arm 240b.

At ends of the first gear arm 240a and the second gear arm 240b, sliding pins 242 that respectively protrude toward the first hinge arm 230a and the second hinge arm 230b are provided, and protrusions 238 of the first hinge arm 230a and the second hinge arm 230b facing the first gear arm 240a and the second gear arm 240b can include sliding spaces 239 through which the sliding pins 242 are movable. Accordingly, during a folding operation or an unfolding operation of the foldable display device 100, the sliding pins 242 move within the sliding spaces 239, and the first gear arm 240a and the second gear arm 240b can rotate in conjunction with the rotation of the first hinge arm 230a and the second hinge arm 230b, A detailed description thereof will be described later with reference to FIGS. 8A and 8B and FIGS. 9A and 9B.

Meanwhile, the gear arms 240 can be rotatably fastened to respective shafts 233.

The gear arms 240 can be referred to as biaxial folding detents and can also be referred to as lever detents.

That is, the gear arms 240 can be configured to include the first gear arm 240a and the second gear arm 240b, and the first hinge arm 230a and the second hinge arm 230b can be fastened to interlock with the first gear arm 240a and the second gear arm 240b, respectively.

The gear arms 240 can be link configurations connected to the biaxial hinge arms 230. That is, the first gear arm 240a and the second gear arm 240b can be connected to the first hinge arm 230a and the second hinge arm 230b, respectively. Accordingly, during a folding operation or an unfolding operation of the foldable display device 100, the first hinge arm 230a and the second hinge arm 230b can rotate together with the rotation of the first gear arm 240a and the second gear arm 240b, and left and right synchronization (e.g., rotational movement synchronization) can be maintained by the first bevel gear 241a and the second bevel gear 241b connected to the first hinge arm 230a and the second hinge arm 230b, respectively.

As such, the first hinge arm 230a and the second hinge arm 230b can interlock with the first gear arm 240a and the second gear arm 240b, respectively.

The shafts 233 of the gear arms 240 (e.g., the first gear arm 240a and the second gear arm 240b) can constitute frames for seating and assembling of cams 245. That is, at least one first cam 245 (e.g., a plurality of first cams) can be seated on first shaft 233 and at least one second cam 245 (e.g., a plurality of second cams) can be seated on a second shaft 233 spaced from the first shaft.

Compression springs 260 for implementing frictional force of the cams 245 can be provided on outer surfaces of the shafts 233 between the gear arms 240 and the cams 245. The compression springs 260 can be separated from one another and can be provided/disposed along a longitudinal axis of the hinge assembly 200.

On the gear arms 240 fastened to the outer surfaces of the shafts 233, second detents 246 for maintaining folding and unfolding angles of the hinge arms 230 and the gear arms 240 together with a plurality of the cams 245 can be provided. That is, each cam 245 can include a body 245a having a first detent 245b that is engaged by one of the second detents of one of the gear arms 240. The first detent 245b can be in the form of a groove or indentation (e.g., have a concave shape) that has a shape that matches (e.g., corresponds) to a shape of the respective second detent 246. Each second detent 246 can be in the form of a protrusion and can have a convex shape that corresponds to a concave shape of the respective first detent 245b. Accordingly, the cam 245 can be a component for maintaining friction during folding and unfolding of the hinge arm 230, in order to allow the foldable display device 100 to maintain either a folded position or an unfolded position. The cam 245 can also be referred to as a slide cam.

Meanwhile, a predetermined hinge housing 210 that accommodates the inner frame 220, the hinge arms 230, and the gear arms 240 can be provided in a lower portion of the hinge assembly 200.

The hinge housing 210 is an exterior cover of the hinge assembly 200, has a predetermined length, and can have a space therein to accommodate the inner frame 220, the hinge arms 230, and the gear arms 240 in the space. The hinge housing 210 can also be referred to as a hinge cover.

The inner frame 220 can be a frame for fixing an inside of the hinge assembly 200. The inner frame 220 can include a plurality of fastening grooves and through grooves. The inner frame 220 is an exterior cover accommodating the pair of first and second bevel gears 241a and 241b, and can also be referred to as a housing cover.

In addition, fixing members 211 (see FIG. 4) that face the fastening grooves of the inner frame 220 are formed in the hinge housing 210, and fixing grooves (or fixing holes) 212 are formed in the fixing members 211, so that the fixing members 211 can be fastened and fixed to the fastening grooves of the inner frame 220 through fastening members, such as screws.

The hinge housing 210 can have a predetermined size, and thus, the inner frame 220, the hinge arms 230, and the gear arms 240 can be accommodated in the space of the hinge housing 210.

Meanwhile, a distance between rotation centers of a pair of the shafts 233 can be formed greater than a distance D between rotation axes C, which are the rotation centers of the pair of hinge arms 230, as shown in FIG. 6B.

In this case, a pair of virtual axes passing through the centers of the pair of shafts 233 can serve as a central axis to which components constituting the hinge housing 210 are coupled. The pair of virtual axes can be provided to correspond to the first cover 110 and the second cover 120, respectively. That is, each shaft 233 can include a virtual axis that serves as a hinge point for a respective one of the hinge arms 230a, 230b.

An axial height H, shown in FIG. 6B can exist between a folded portion in which the first hinge arm 230a and the second hinge arm 230b are in contact with the display panel 180, and the rotation axis C, but the present disclosure is not limited thereto.

Meanwhile, as described above, the first embodiment of the present disclosure is characterized in that the hinge support 250 in a "T" shape is disposed between the first gear arm 240a and the second gear arm 240b of the hinge assembly 200. Through the up/down method (e.g., movement) of the hinge support 250, an escape structure for realizing the curvature of the display panel 180 when folded is secured and at the same time, the first gear arm 240a and the second gear arm 240b can be supported, thereby improving impact resistance properties. That is, as shown in FIG. 9B, for example, the hinge support 250 protects a curved portion of the display panel 180.

The hinge support 250 can be disposed in the inner frame 220 between the first gear arm 240a and the second gear arm 240b in a longitudinal direction of the inner frame 220.

The hinge support 250 can have a "T"-shape with an upper end protruding (e.g., extending) in a direction perpendicular to the longitudinal direction.

The hinge support 250 can have an empty inner space, but is not limited thereto.

Meanwhile, as described above, the present disclosure is characterized by having a link slider structure as well as two bevel gears 241a and 241b for synchronization between axes during biaxial rotation (e.g., synchronous movement of the hinge arms 230), which will be described in detail with reference to FIGS. 7A and 7B to 9A and FIG. 9B.

Figure 7A:
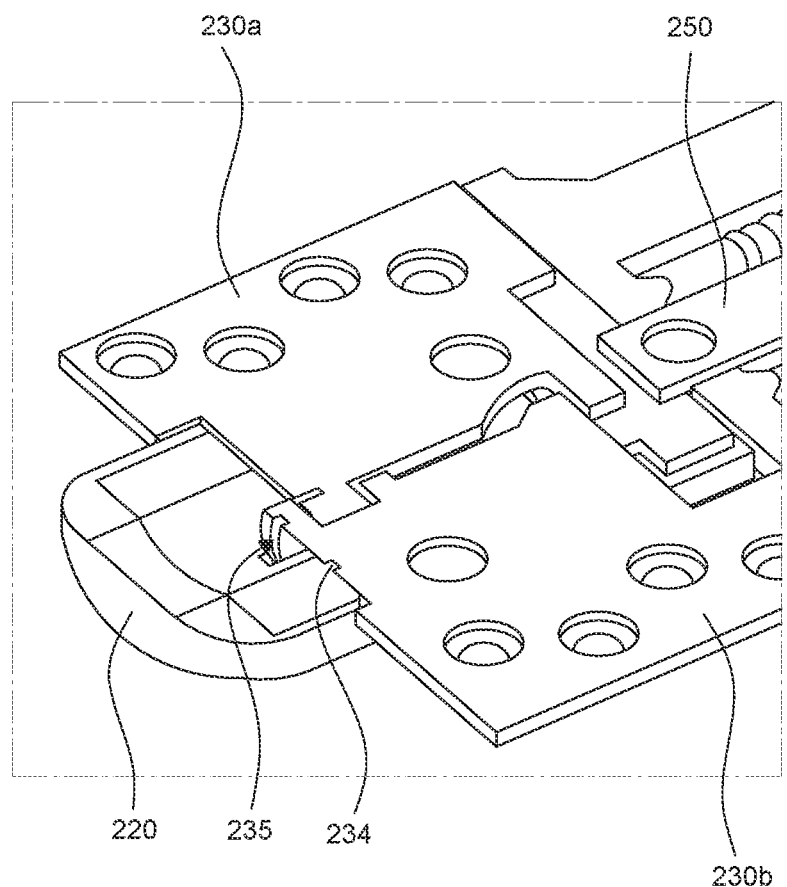
FIG. 7A is a perspective view illustrating an unfolded state of the hinge assembly.

FIG. 7A is a perspective view illustrating an unfolded state of the hinge assembly.

Figure 7B:
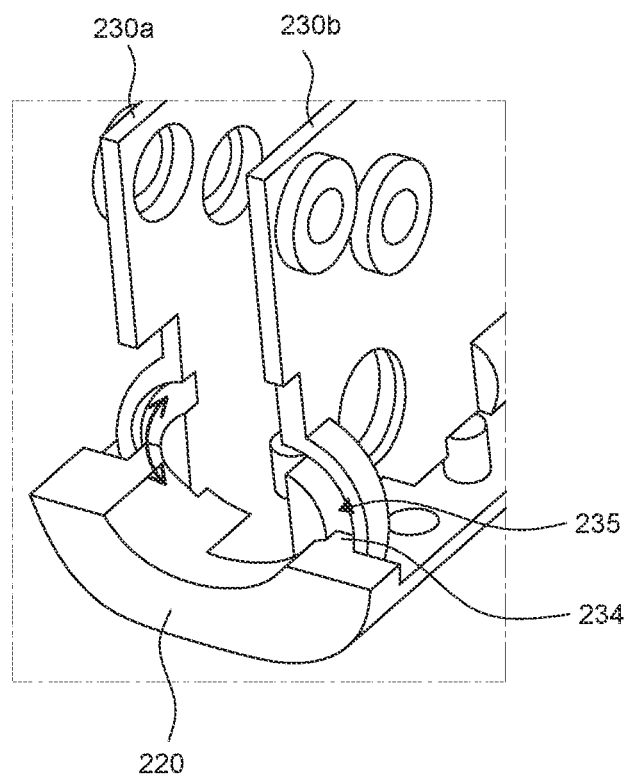
FIG. 7B is a perspective view illustrating a folded state of the hinge assembly.

FIG. 7B is a perspective view illustrating a folded state of the hinge assembly.

Figure 8A:
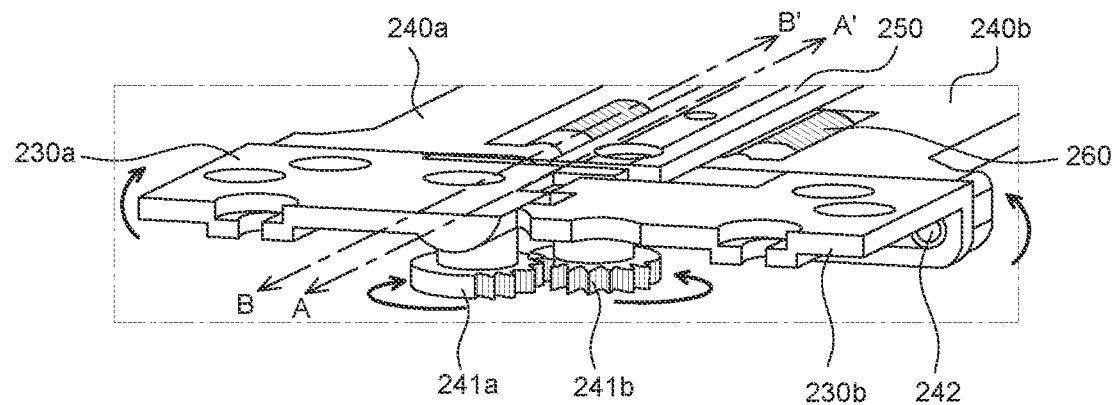
FIG. 8A is another perspective view illustrating an unfolded state of the hinge assembly.

FIG. 8A is another perspective view illustrating an unfolded state of the hinge assembly.

Figure 8B:
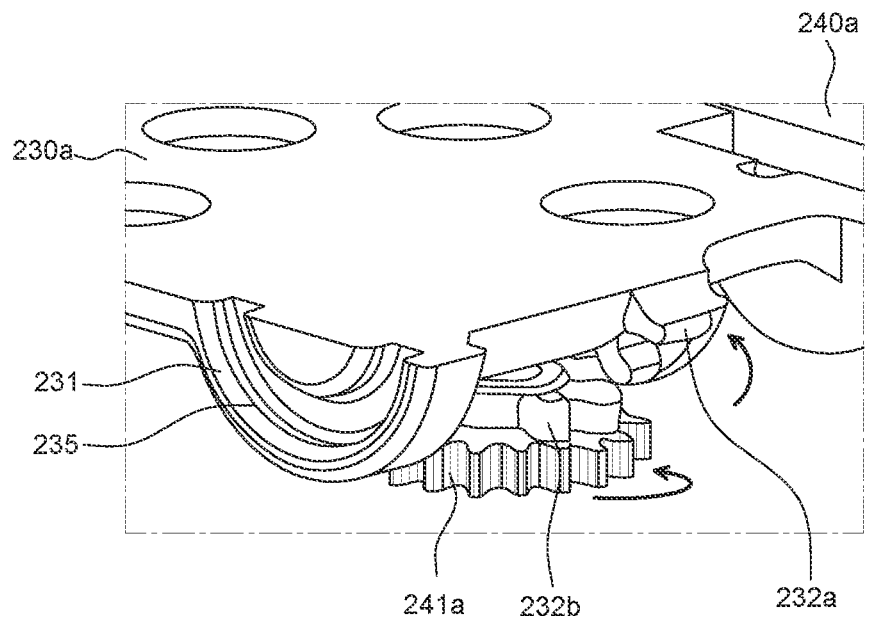
FIG. 8B is an enlarged view of showing the structure of the hinge arms 230 of FIG. 8A.

FIG. 8B is an enlarged view of showing the structure of the hinge arms 230 of FIG. 8A.

Figure 9A:
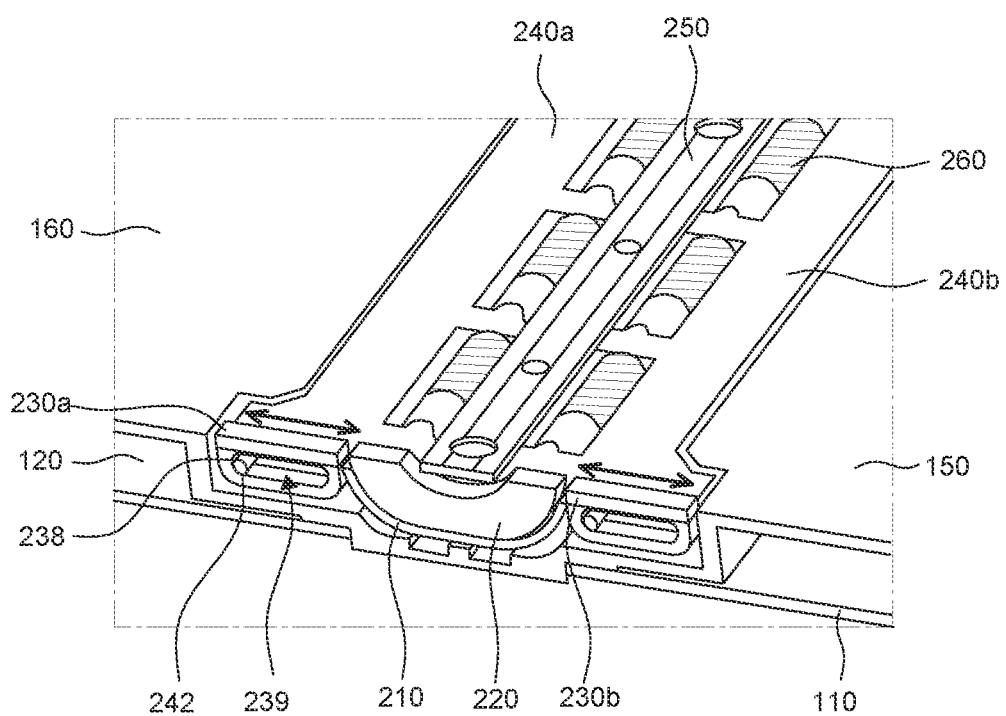
FIG. 9A is a cut-away perspective view illustrating an unfolded state of the foldable display device according to the first embodiment of the present disclosure.
Figure 9B:
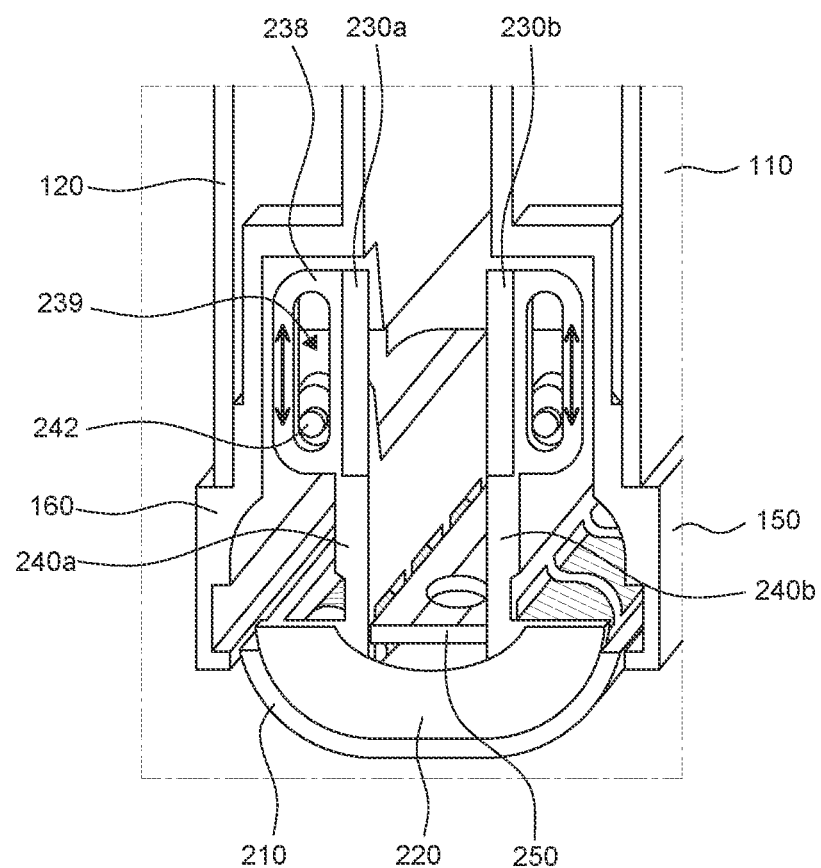
FIG. 9B is a cut-away perspective view illustrating a folded state of the foldable display device according to the first embodiment of the present disclosure.

FIG. 9A is a cut-away perspective view illustrating an unfolded state of the foldable display device according to the first embodiment of the present disclosure.

FIG. 9B is a cut-away perspective view illustrating a folded state of the foldable display device according to the first embodiment of the present disclosure.

FIGS. 8A and 8B show, as an example, a cut-away perspective view of the hinge assembly cut along line B-B' of FIG. 6A.

FIGS. 7A and 7B and FIGS. 8A and 8B show a part of the hinge assembly in which the hinge housing 210 is removed for convenience of description.

FIGS. 9A and 9B show a specific unfolded state and a specific folded state, respectively, of the foldable display in which the display panel and the bezel cover are omitted for convenience of explanation.

Referring to FIGS. 7A and 7B to FIGS. 9A and 9B, the set housing 110 can be disposed under the hinge assembly and the set frames 150 and 160.

As described above, the set frames 150 and 160 can include the first support plate 150 on the left (e.g., first side or first lateral side) and the second support plate 160 on the right (e.g., second side or second lateral side), and the first frame on the left and the second frame on the right, but the present disclosure is not limited thereto.

The first support plate 150 and the second support plate 160 can folded be separately provided to be independently of each other, and the hinge assembly can be provided therebetween.

The foldable display device according to the first embodiment of the present disclosure can be implemented in an inner folding manner (e.g., such that the display panel 180 folds in half or folds towards itself) in which a screen unit is disposed internally (e.g., not exposed to outside of the foldable display device), when folded.

In addition, the first support plate 150 and the second support plate 160 according to the first embodiment of the present disclosure can be disposed in one area and the other area where the foldable display device is folded and unfolded.

The hinge assembly can include the hinge housing 210, the first and second hinge arms 230a and 230b, and the inner frame 220.

In addition, the hinge assembly according to the first embodiment of the present disclosure can further include the upper hinge arm cover and the lower hinge arm cover that are fastened at the upper and lower portions of the first and second hinge arms 230a and 230b.

The hinge assembly can include the pair of hinge arms 230a and 230b, and the hinge arms 230a and 230b can include the first hinge arm 230a and the second hinge arm 230b that are symmetrical to each other.

The first hinge arm 230a and the second hinge arm 230b according to the first embodiment of the present disclosure are characterized by having a biaxial folding (rotational) structure.

In this case, the first hinge arm 230a and the second hinge arm 230b can be folded (e.g., rotated) along a folding trajectory of the housing cover rail 235 (refer to the double arrow of FIG. 7B, showing a rotational movement of the first hinge arm 230a and the second hinge arm 230b).

That is, a pair of guide pins 234 that protrude toward the first hinge arm 230a and the second hinge arm 230b that are inside can be provided at an upper end of the inner frame 220, and a pair of housing cover rails 235 into which the pair of guide pins 234 are fitted can be provided on the first hinge arm 230a and the second hinge arm 230b that face the pair of guide pins 234, but the present disclosure is not limited thereto. Accordingly, the first hinge arm 230a and the second hinge arm 230b can be folded (e.g., rotated) along the folding trajectory of the housing cover rail 235 while being guided by the pair of guide pins 234.

In addition, the first embodiment of the present disclosure is characterized by having two bevel gears 241a and 241b and a link slider structure for synchronization between axes during biaxial rotation.

In particular, in the foldable display device of the present disclosure, a thickness of the foldable display device can be minimized by using two bevel gears instead of four general gears.

That is, when left and right synchronization is adjusted with four general gears, a thickness of the hinge assembly can be increased by a thickness of four gears that are vertically disposed. Accordingly, in the first embodiment of the present disclosure, the thickness and weight of the hinge assembly can be reduced by adjusting the left and right synchronization with the two bevel gears 241a and 241b. In addition, folding of an R value that is smaller than an existing case can be enabled.

Specifically, the bevel gears 241 can include the first bevel gear 241a coupled to the first hinge arm 230a and the second bevel gear 241b coupled to the second hinge arm 230b.

The first bevel gear 241a and the second bevel gear 241b can have a virtual axis different from the rotation axis C, which is an actual axis (e.g., rotation axis). That is, the first bevel gear 241a and the second bevel gear 241b can have a virtual axis substantially perpendicular to the rotation axis C.

Each of the first tooth portion and the second tooth portion formed in the first bevel gear 241a and the second bevel gear 241b, respectively can be formed only in a portion of a circumference, but the present disclosure is not limited thereto.

The first bevel gear 241a and the second bevel gear 241b can be disposed to mesh with each other. However, the present disclosure is not limited thereto, and the first bevel gear 241a and the second bevel gear 241b can mesh with the first rotation gear and the second rotation gear, respectively, and the first rotation gear and the second rotation gear can be configured to mesh (e.g., engage) with each other.

The first bevel gear 241a and the second bevel gear 241b can include second idle gears 232b that mesh with first idle gears 232a of the respective first hinge arm 230a and second hinge arm 230b in order to convert and transmit rotation of each of the first hinge arm 230a and the second hinge arm 230b in a perpendicular direction (refer to FIGS. 8A and 8B).

In this case, the first idle gear 232a and the second idle gear 232b can be disposed in a substantially perpendicular direction to convert the rotation in the perpendicular direction. That is, the first bevel gear 241a and the second bevel gear 241b are respectively rotatably fastened to the first idle gears 232a of the first hinge arm 230a and the second hinge arm 230b through the second idle gears. The first hinge arm 230a and the second hinge arm 230b are slidably fastened to the first gear arm 240a and the second gear arm 240b, respectively, so that a folding operation and an unfolding operation of the foldable display device 100 can be performed while left and right synchronization is maintained.

That is, when the first hinge arm 230a and the second hinge arm 230b are folded/unfolded in the perpendicular direction, the first bevel gear 241a and the second bevel gear 241b rotate in a horizontal direction (e.g., different from a rotational direction of movement of the first hinge arm 230a and the second hinge arm 230b), thereby adjusting synchronization.

Meanwhile, the rotation axes C of the first hinge arm 230a and the second hinge arm 230b and a pair of virtual axes B passing through the centers of the pair of shafts 233 can be different from each other. That is, the rotation axes C about which the first hinge arm 230a and the second hinge arm 230b are folded/unfolded and the virtual axes B (e.g., about B-B' of FIG. 8A) about which the first gear arm 240a and the second gear arm 240b are folded/unfolded do not coincide with each other, and they can be connected with a link slide structure and thus, interlock with each other.

Accordingly, the virtual axes B about which the first gear arm 240a and the second gear arm 240b are folded/unfolded are the central axes of the shafts 233, and the rotation axes C about which the first hinge arm 230a and the second hinge arm 230b are folded/unfolded are central axes of the housing cover rails 235. Two different folding/unfolding axes can be connected with a link slide structure so that they interlock with each other.

That is, the first embodiment of the present disclosure is characterized in that two first bevel gear 241a and second bevel gear 241b are provided for synchronization between shafts 233 during biaxial rotation, while the first gear arm 240a and the second gear arm 240b are slidably fastened to the first hinge arm 230a and the second hinge arm 230b, respectively.

That is, at the ends of the first gear arm 240a and the second gear arm 240b, the sliding pins 242 protruding toward the first hinge arm 230a and the second hinge arm 230b are respectively provided. The sliding spaces 239 in which the sliding pins 242 are movable can be provided in the first hinge arm 230a and the second hinge arm 230b that face the first gear arm 240a and the second gear arm 240b. Accordingly, during a folding operation or an unfolding operation of the foldable display device, the sliding pins 242 move in the sliding spaces 239, and the first gear arm 240a and the second gear arm 240b can rotate (be folded/unfolded) in conjunction with rotation (folding/unfolding) of the first hinge arm 230a and the second hinge arm 230b. As described above, a biaxal hinge operation can be synchronized through two first bevel gear 241a and second bevel gear 241b and a link slider structure.

In this case, the sliding spaces 239 can be provided in the protrusions 238 of the first hinge arm 230a and the second hinge arm 230b, but the present disclosure is not limited thereto.

Meanwhile, the present disclosure is characterized by implementing holding force using frictional force (e.g., via cams 245) between components constituting the hinge in order to maintain a specific folding angle of the foldable display device during a folding operation and an unfolding operation of the foldable display device.

That is, the hinge assembly according to the present disclosure can be disposed at a portion where the foldable display device is folded and unfolded to thereby facilitate a folding operation and an unfolding operation of the foldable display device. Also, the hinge assembly according to the present disclosure can provide holding force to maintain the foldable display device in a folded state at a specific angle.

As described above, the display panel can be disposed on one surface of the first support plate 150 and the second support plate 160. As the display panel, one of various display panels such as an organic light emitting display panel and a liquid crystal display panel can be used. Also, the display panel can have flexibility so that it can be folded and unfolded together with folding and unfolding of the foldable display device.

The foldable display device can be folded such that the first support plate 150 and the second support plate 160 form a specific folding angle. That is, although it is illustrated that the first support plate 150 and the second support plate 160 are fully unfolded to have an angle of, for example, 180° in FIG. 9A (e.g., substantially planar), the foldable display device can be folded at a specific angle. That is, in FIG. 9B, it is illustrated that the first support plate 150 and the second support plate 160 are in a folded state to have an angle of 90° (or an angle of 180° with respect to each other), for example, but the present disclosure is not limited thereto. In this case, the display panel disposed on the first support plate 150 and the second support plate 160 can also be folded together with folding of the first support plate 150 and the second support plate 160.

The foldable display device can be folded at a specific angle according to a user's intention. Also, the foldable display device can be completely folded or unfolded according to a user's intention. The foldable display device is capable of inner folding (or in-folding) and folded or unfolded so that the display panel is disposed on an inside thereof, and is capable of out-folding and folded or unfolded so that the display panel is disposed on an outside thereof.

The foldable display device can maintain a specific folding angle by holding force provided from the hinge assembly. In other words, the first support plate 150 and the second support plate 160 can be fixed in a state in which they maintain a specific folding angle by the hinge assembly. Accordingly, the foldable display device can be folded at a specific angle according to a user's intention, and can maintain a folded state at a specific angle by the holding force of the hinge assembly.

In particular, the present disclosure is characterized in that a specific folding angle of the foldable display device can be maintained by implementing holding torque and a free stop function through applying a structure of the cam 245 (e.g., a plurality of cams shown in FIG. 6A) including the compression spring 260 (e.g., a plurality of compression springs 260, each compression spring 260 corresponding to a respective one of the cams 245, as shown in FIG. 6A), which will be described in detail with reference to FIG. 10.

Figure 10:
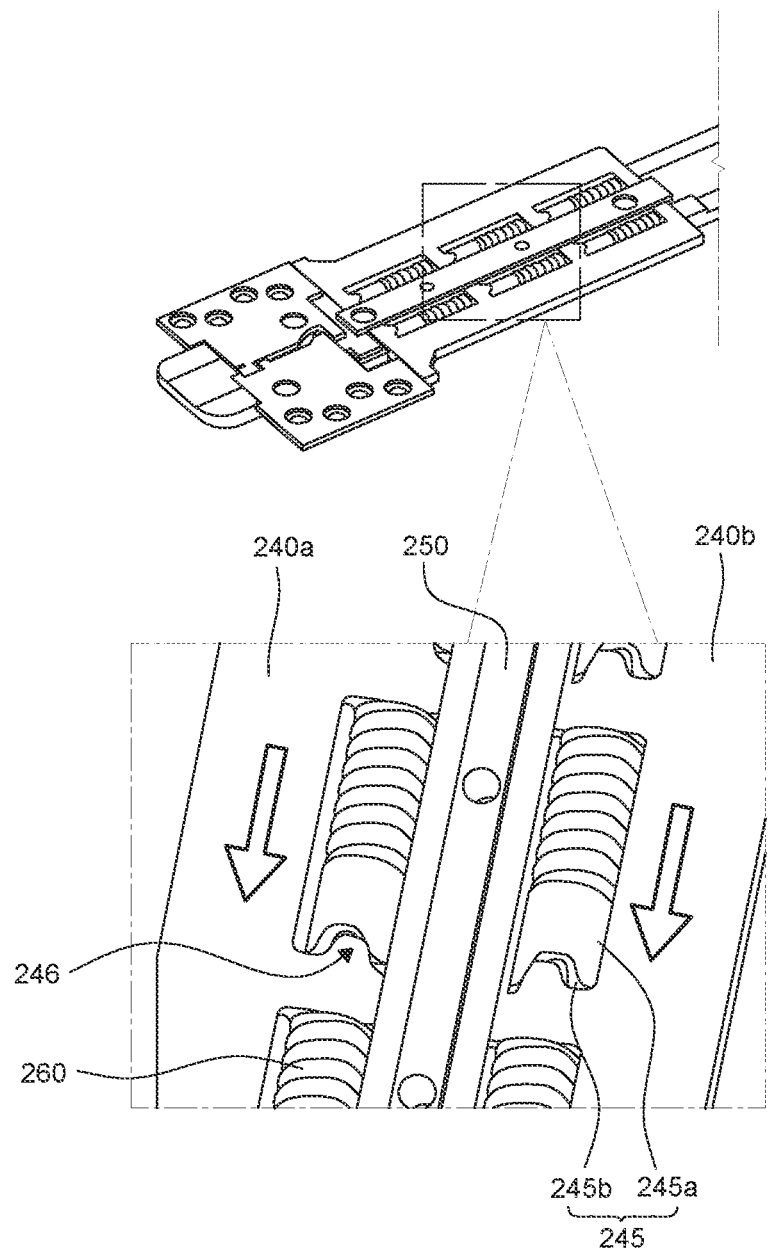
FIG. 10 is a perspective view illustrating as an example a part of a configuration of the hinge assembly according to the first embodiment of the present disclosure.

FIG. 10 is a perspective view illustrating a part of a configuration of the hinge assembly according to the first embodiment of the present disclosure.

FIG. 10 shows, as an example, a part of a configuration of the hinge assembly including the compression spring(s) 260 and the cam(s) 245.

Referring to FIG. 10, in the present disclosure, torque can be implemented by a cam structure of the first gear arm 240a and the second gear arm 240b and the cam 245 and compression force of the compression spring 260.

That is, the holding torque (e.g., holding/maintaining a position) and the free stop function can be implemented by applying the compression spring 260 and the cam structure during an open or close rotation.

Specifically, the hinge assembly of the present disclosure can include a pair of cam structures functioning as a free stop hinge, for example, can be formed of a first cam structure of the cam 245 and a second cam structure of the first gear arm 240a and the second gear arm 240b.

In this case, the free stop hinge means a hinge device that does not provide stopping force at 180 degrees during opening and closing operations of the foldable display device, and means that the foldable display device does not receive stopping force from the hinge device except at 0 degrees and 360 degrees.

The first and second cam structures can be configured as rotating cams. However, the present disclosure is not limited thereto, and one cam structure among the first and second cam structures can be configured as a rotating cam, and the other cam structure can be configured as a sliding cam, but the present application is not limited thereto. The first cam structure and the second cam structure can support a stop state of the foldable display device while performing a cam operation with cam surfaces facing each other. The cam operation provides force for the compression springs 260 to be in close contact with each other and is possible through the cam operation of rotation and/or sliding of the first cam structure and the second cam structure.

The first cam structure employed in the hinge assembly 200 according to the first embodiment of the present disclosure is configured as the cam 245 including a body 245a and a first detent 245b provided on one surface of the body 245a, and the second cam structure can include a second detent 246 provided on one surface of the first gear arm 240a and the second gear arm 240b.

At the center of the body 245a of the cam 245, a first hinge hole for inserting the shaft 233 can be formed in an axial direction of the shaft 233

In addition, at a center (e.g., axial center) of each of the first gear arm 240a and a center of the second gear arm 240b, a second hinge hole for inserting the shaft 233 can be formed in the axial direction of the shaft 233.

The first detent 245b can have a protruding shape in a mountain shape (e.g., convex shape), and can protrude from the body 245a in a direction of the first gear arm 240a and the second gear arm 240b. The second detent 246 can have a protruding shape (e.g., concave shape) in a mountain shape, and can protrude from the first gear arm 240a and the second gear arm 240b toward the cam 245. The mountain shape means that a surface has an ascending sloped sliding face, a descending sloped sliding face and a flat sliding face. However, the present disclosure is not limited thereto.

A plurality of first detents 245b can be provided at predetermined intervals with respect to the first hinge hole. A plurality of second detents 246 can be provided at predetermined intervals with respect to the second hinge hole. The plurality of first detents 245b and the plurality of second detents 246 can be disposed at positions facing each other.

Meanwhile, the cam structures of the present disclosure can allow for an increase in the number of the first cam structure and the second cam structure in order to increase torque (e.g., friction so as to main a folded position).

That is, the present disclosure is characterized in that the first cam structure and the second cam structure are disposed in the number of 2×3. Accordingly, it is possible to secure sufficient friction torque even with a small part with a thin thickness of the hinge assembly.

As described above, by applying the cam structures of 2×3 (two columns by three rows), a leaf spring for assisting free stop is not required, thereby preventing generation of dust due to the leaf spring and preventing breakage of parts. Accordingly, it is possible to secure folding reliability.

Meanwhile, as described above, the first embodiment of the present disclosure is characterized in that the hinge support 250 in a "T" shape is disposed between the first hinge arm 230a and the second hinge arm 230b. Through the up/down method of the hinge support 250, an escape structure for realizing (e.g., supporting) the curvature of the display panel when folded is secured and at the same time, the first gear arm 240a and the second gear arm 240b can be supported, thereby improving impact resistance properties.

Figure 11A:
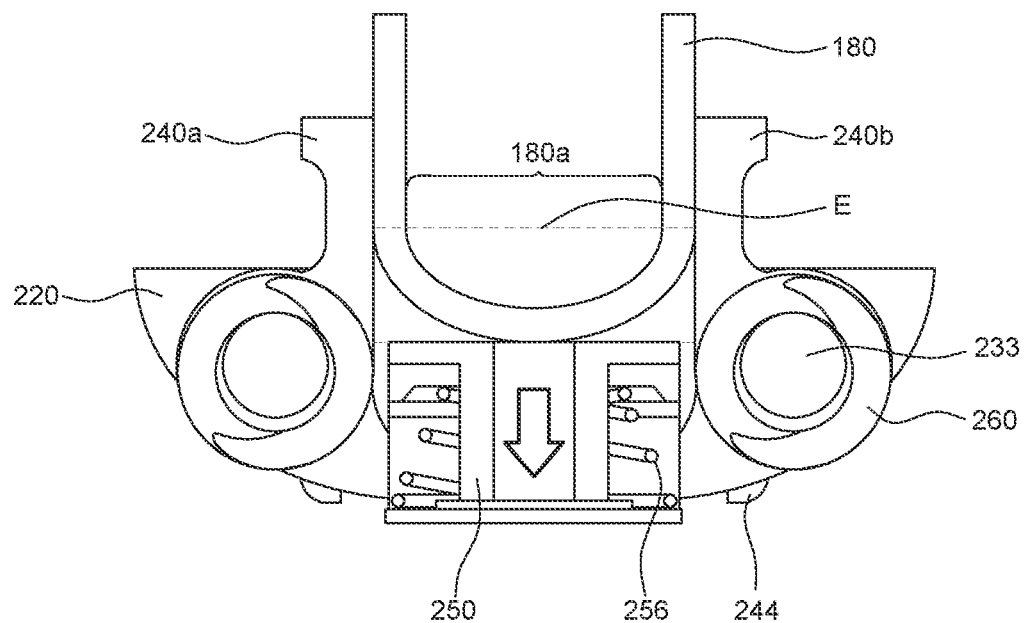
FIGS. 11A and 11B are cross-sectional views taken along line A-A' of FIG. 3.
Figure 11B:
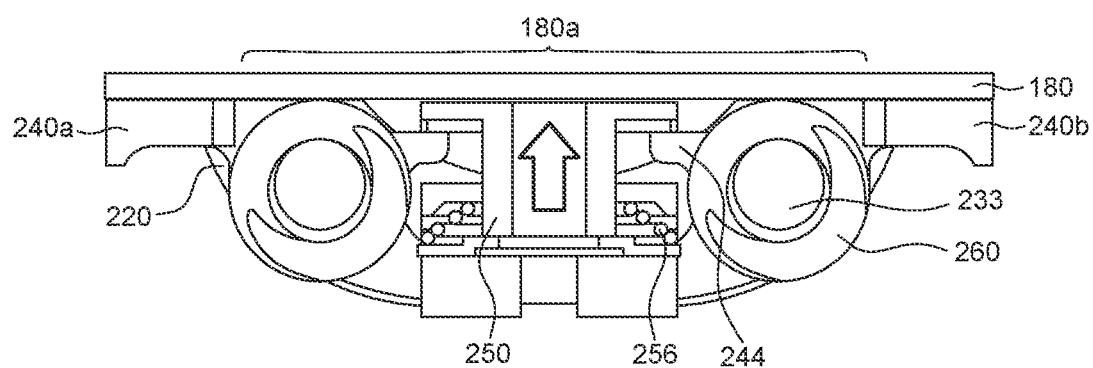

FIGS. 11A and 11B are cross-sectional views taken along line A-A' of FIG. 3.

FIG. 11A is a cross-sectional view illustrating a folded state of the foldable display, and FIG. 11B is a cross-sectional view illustrating an unfolded state of the foldable display device.

Referring to FIGS. 11A and 11B, the hinge support 250 can be disposed in the inner frame 220 between the first gear arm 240a and the second gear arm 240b in the longitudinal direction of the inner frame 220.

The hinge support 250 can have a "T"-shape with an upper end protruding to both sides thereof. That is, for example, the hinge support 250 can have a "T"-shape in cross-section cut in a direction perpendicular to the longitudinal direction.

The hinge support 250 can have an empty inner space, but is not limited thereto.

The hinge support 250 can support a folding portion 180a of the display panel 180.

A current foldable display device needs an escape structure to realize the curvature of the display panel when the hinge is folded, and impact resistance properties can be degraded due to the escape structure. That is, conventionally, a gap exists between the folding portion of the display panel and the hinge assembly in order to implement an R shape of the display panel when folded, so that impact resistance characteristics such as puncture and ball drop are vulnerable.

Accordingly, the first embodiment of the present disclosure is characterized in that the hinge support 250 in a "T"-shape is disposed between the first gear arm 240a and the second gear arm 240b of the hinge assembly 200, so that an escape space E for realizing the curvature of the display panel 180 is formed by lowering the hinge support 250 (refer to FIG. 11A) during folding and the folding portion 180a of the display panel 180 is supported by raising the hinge support 250 during unfolding (refer to FIG. 11B).

Specifically, referring to FIG. 11B, when the foldable display device is unfolded, lift bumps 244 can raise the hinge support 250 so that the folding portion 180a of the display panel 180 is supported thereby. That is, a lift bump 244 protrudes from inner ends of each of the first gear arm 240a and the second gear arm 240b. And, when the foldable display device is unfolded, the lift bumps 244 move from a lower portion to an upper portion simultaneously with unfolding of the first gear arm 240a and the second gear arm 240b and lift both protruding upper ends of the hinge support 250 to thereby raise the hinge support 250.

On the other hand, referring to FIG. 11A, when the foldable display device is folded, as the lift bump 244 moves downward and no longer constrains the hinge support 250, the hinge support 250 descends again by restoring force of the compression spring 256 that is provided in an outside of the hinge support 250, so that the escape space E for realizing the curvature of the display panel 180 can be formed. That is, the compression spring 256 pulls the hinge support downward to form the "escape space," which is a space to support a curved portion of the display panel 180 caused by a folding operation.

At this time, the compression spring 256 having a very thin thickness can be applied, and can be compressed even with a thin thickness compared to a general spring.

In addition, the compression spring 256 can have a triangular pyramid shape so that spring lines do not overlap in consideration of the thin thickness of the hinge assembly, but is not limited thereto.

Meanwhile, the present disclosure is characterized by providing a foldable display device having improved usability by removing a space between the display panel and the hinge support through using magnetic force during folding, which will be described in detail with reference to FIGS. 12 and 13.

Figure 12:
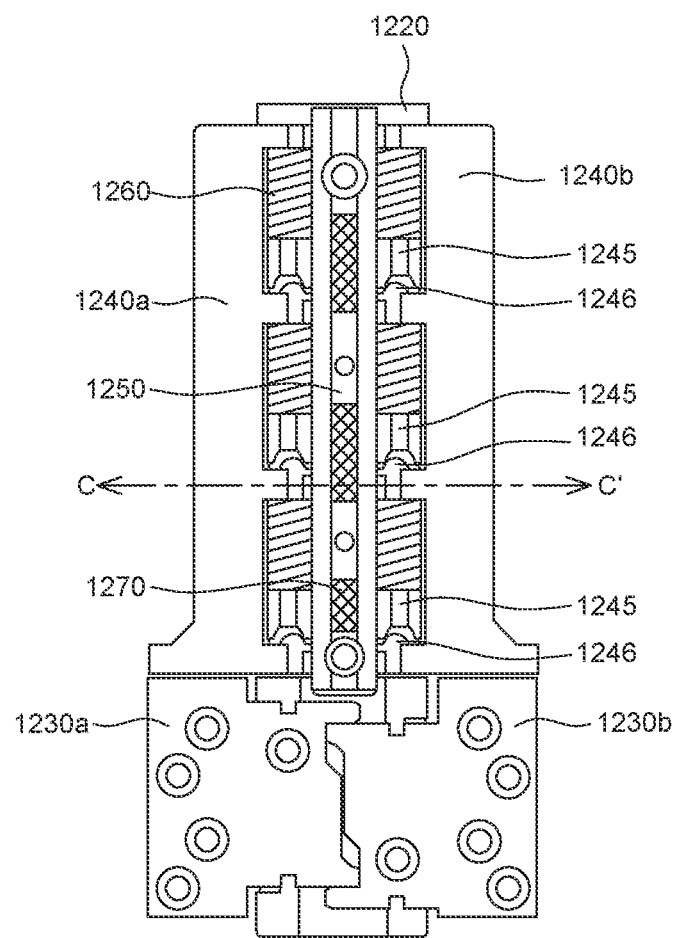
FIG. 12 is a plan view of a hinge assembly according to a second embodiment of the present disclosure.

FIG. 12 is a plan view of a hinge assembly according to a second embodiment of the present disclosure.

Figure 13:
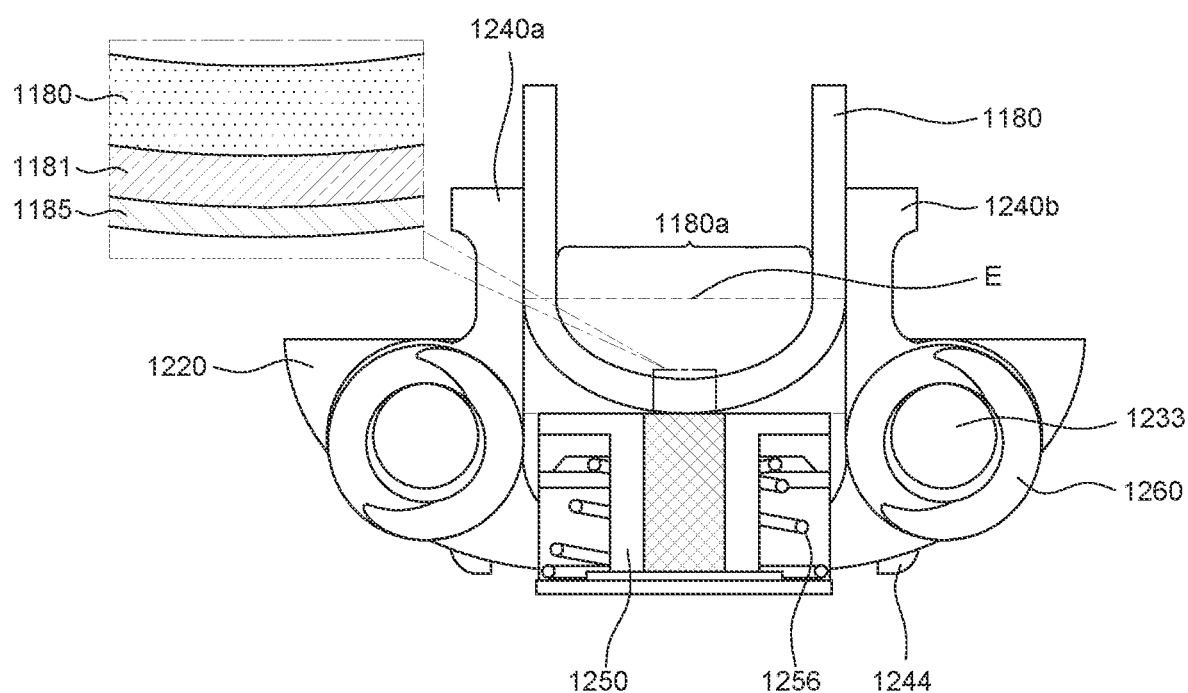
FIG. 13 is a cross-sectional view taken along line C-C' of FIG. 12.

FIG. 13 is a cross-sectional view taken along line C-C' of FIG. 12.

FIG. 13 is a partial cross-sectional view of a foldable display device in which a display panel 1180 is installed on the hinge assembly of FIG. 12.

The second embodiment of the present disclosure shown in FIGS. 12 and 13 differs from the first embodiment described above only in that a magnetic material is provided on a lower portion of the display panel 1180 and a magnet 1270 is provided in a hinge support 1250 facing it, and other configurations thereof are substantially the same, so redundant descriptions will be omitted. The same reference numerals are used for the same components.

Referring to FIGS. 12 and 13, the hinge assembly according to the second embodiment of the present disclosure can include a hinge housing, a pair of hinge arms 1230a and 1230b, and an inner frame 1220.

The hinge assembly can include a first hinge arm 1230a and a second hinge arm 1230b having a structure in which they are symmetrical to each other on one side thereof.

The hinge arms 1230a and 1230b according to the first embodiment of the present disclosure have a biaxial folding (rotational) structure.

In addition, the second embodiment of the present disclosure is characterized by having two bevel gears and a link slider structure for synchronization between axes during biaxial rotation.

The first hinge arm 1230a and the second hinge arm 1230b are slidably fastened to a first gear arm 1240a and a second gear arm 1240b, respectively, so that a folding operation and an unfolding operation of the foldable display device can be performed while left and right synchronization is maintained.

The magnet 1270 can be rotatably fastened to shafts 1233, respectively.

Compression springs 1260 for implementing frictional force of cams 1245 can be provided on outer surfaces of the shafts 233 between the gear arms 1240a and 1240b and the cams 1245.

In addition, on the gear arms 1240a and 1240b fastened to the outer surfaces of the shafts 1233, second detents 1246 for maintaining folding and unfolding angles of the hinge arms 1230a and 1230b and the gear arms 1240a and 1240b together with a plurality of the cams 1245 can be provided.

Meanwhile, as described above, the second embodiment of the present disclosure is characterized in that the hinge support 1250 in a "T" shape is disposed between the first gear arm 1240a and the second gear arm 1240b of the hinge assembly. Through an up/down method (e.g., vertical movement) of the hinge support 1250, an escape structure for realizing (e.g., supporting) a curvature of the display panel 1180 when folded is secured and at the same time, the first gear arm 1240a and the second gear arm 1240b can be supported, thereby improving impact resistance properties.

Also, when the foldable display device is unfolded, lift bumps 1244 can raise the hinge support 1250 to support a folding portion 1180a of the display panel 1180.

When a space exists between the display panel 1180 and the hinge support 1250 when the foldable display device is folded, a touch defect such as shaking or double pressing can occur in a case of touch with a pen. Also, since the folding portion 1180a of the display panel 1180 does not have an external fixing part, a reverse folding phenomenon can occur during folding, which can damage the display panel 1180.

Accordingly, the second embodiment of the present disclosure is characterized in that a predetermined magnetic sheet 1185 is attached to a rear surface of the display panel 1180, and the magnet 1270 is disposed in an inner space of the hinge support 1250 along a longitudinal direction of the hinge support 1250. When the display panel is folded, the magnet 1270 is magnetically coupled (e.g., attached via a magnetic force) to the magnetic sheet to eliminate a space between the hinge support 1250 and the display panel 1180.

For example, the magnetic sheet 1185 can be formed by mixing ferromagnetic powder with polymer resin. The magnetic sheet 1185 has flexibility compared to an existing hard metal plate and processing thereof is facilitated, and magnetic force can be adjusted according to the content of the ferromagnetic powder.

In this case, a ferromagnetic material is a material that is magnetized even in absence of an external magnetic field, and monoatomic ferromagnetic materials includes iron, nickel, cobalt, and the like, and metal oxides such as iron oxide, chromium oxide, and ferrite can also have ferromagnetic properties.

Also, the magnetic sheet 1185 can be attached to the rear surface of the display panel 1180 through an adhesive film 1181.

The adhesive film 1181 can be formed of an optically clear adhesive film (OCA film), a resin (e.g., optically transparent resin), or the like, but is not limited thereto.

The magnetic sheet 1185 can be attached to an entirety of the rear surface of the display panel 1180, but is not limited thereto, and can also be attached only to a rear surface of the folding portion 1180a of the display panel 1180.

As described above, in the case of the second embodiment of the present disclosure, the magnetic sheet 1185 is attached to the rear surface of the display panel 1180 (via the adhesive film 1181, and the magnet 1270 is disposed to face it (e.g., face the magnetic sheet 1185) in the inner space of the hinge support 1250, so that a space between the display panel 1180 and the hinge assembly can be removed and airtightness can be maximized. Further, a plurality of spaced apart magnets 1270 can be provided, which can be spaced apart in a longitudinal direction of the hinge support 1250. Accordingly, it is possible to prevent a touch defect such as shaking or double pressing during a touch, and also to prevent a phenomenon in which the folding portion 1180a of the display panel 1180 is reversely folded during a folding operation.

For reference, as a result of a puncture test, in the case of the second embodiment of the present disclosure, a similar level was obtained in a cover glass, but strain inside the display panel 1180 was reduced.

For example, it can be seen that in the case of the cover glass, levels of strain before and after applying the magnet 1270 were 131.9 Mpa and 130.9 Mpa, respectively, and in the case of an insulating layer inside the display panel 1180, levels of strain before and after applying the magnet 1270 were 0.221% and 0.198%, respectively, and in the case of a thin film transistor, levels of strain before and after applying the magnet 1270 is 0.326% and 0.396%, respectively.

The embodiments of the present disclosure can also be described as follows:

According to an aspect of the present disclosure, there is provided a foldable display device. The foldable display device includes a first support plate and a second support plate; a display panel disposed on the first support plate and the second support plate; and a hinge assembly disposed between the first support plate and the second support plate, wherein the hinge assembly includes, a first hinge arm and a second hinge arm rotatably connected to each other, a first bevel gear and a second bevel gear respectively coupled to the first hinge arm and the second hinge arm in a perpendicular direction, and a first gear arm and a second gear arm fastened to interlock with the first hinge arm and the second hinge arm, wherein the display panel performs a folding operation and an unfolding operation about a rotation axis different from central axes of the first bevel gear and the second bevel gear.

The first bevel gear and the second bevel gear can be disposed to mesh with each other, and the first bevel gear and the second bevel gear can include second idle gears meshing with first idle gears of the first hinge arm and the second hinge arm, respectively.

The first idle gears and the second idle gears can be disposed in a direction perpendicular to each other.

The foldable display device can further include a pair of shafts to which the first gear arm and the second gear arm are rotatably coupled.

The first hinge arm and the second hinge arm can rotate together along with rotation of the first gear arm and the second gear arm, and left and right synchronization can be maintained by the first bevel gear and the second bevel gear which are connected to the first hinge arm and the second hinge arm, respectively.

The foldable display device can further include a compression spring provided on an outer surface of the shaft between the first and second gear arms and a cam.

The cam can include a body and a first detent provided on one surface of the body, and the first gear arm and the second gear arm can include a second detent provided on one surface thereof.

The first detent can protrude from the body in a direction of the first gear arm and the second gear arm, and the second detent can protrude from the first gear arm and the second gear arm in a direction of the cam.

The foldable display device can further include a hinge support disposed in an inner frame between the first gear arm and the second gear arm in a longitudinal direction of the inner frame.

The hinge support can have a "T"-shape in cross-section cut in a direction perpendicular to the longitudinal direction.

When the display panel can be folded, the hinge support can descend to form an escape space "D" for realizing a curvature of the display panel, and when the display panel can be unfolded, the hinge support can rise to support a folding portion of the display panel.

The foldable display device can further include lift bumps disposed to protrude from inner ends of the first gear arm and the second gear arm, respectively, when the display panel can be unfolded, the lift bumps can move from a lower portion to an upper portion simultaneously with unfolding of the first gear arm and the second gear arm, and can lift both protruding upper ends of the hinge support to thereby raise the hinge support.

When the display panel can be folded, the lift bumps can move downward, and the hinge support can descend again by restoring force of a compression spring provided on the hinge support, so that the escape space can be formed.

The compression spring can be provided on an outside of the hinge support having a "T"-shape and can have a triangular pyramid shape.

The foldable display device can further include sliding pins protruding toward the first hinge arm and the second hinge arm at ends of the first gear arm and the second gear arm, respectively.

The sliding pins can slidably move along sliding spaces provided in the first hinge arm and the second hinge arm which face the first gear arm and the second gear arm during the folding operation and the unfolding operation.

The foldable display device can further include a pair of guide pins provided on an upper end of the inner frame and protruding toward the first hinge arm and the second hinge arm; and a pair of housing cover rails which are provided on the first hinge arm and the second hinge arm facing the pair of guide pins, and into which the pair of guide pins are fitted, the first hinge arm and the second hinge arm can be folded (rotated) along a folding trajectory of the housing cover rail while being guided by the pair of guide pins.

The foldable display device can further include a magnetic sheet attached to a rear surface of the display panel; and a magnet disposed in an inner space of the hinge support facing the magnetic sheet.

The magnetic sheet can be attached to the rear surface of the display panel through an adhesive film, and the magnet can be disposed along a longitudinal direction of the hinge support.

The magnetic sheet can be attached only to a rear surface of a folding portion of the display panel.

Various embodiments described herein can be implemented in a computer-readable medium using, for example, software, hardware, or some combination thereof. For example, the embodiments described herein can be implemented within one or more of Application Specific Integrated Circuits (ASICS), Digital Signal Processors (DSPs), Digital Signal Processing Devices (DSPDS), Programmable Logic Devices (PLDs), Field Programmable Gate Arrays (FPGAs), processors, controllers, micro-controllers, microprocessors, other electronic units designed to perform the functions described herein, or selective combination thereof. In some cases, such embodiments are implemented by the controller. For Example, the controller is a hardware-embedded processor executing the appropriate algorithms (e.g., flowcharts) for performing the described functions and thus has sufficient structure. Also, the embodiments such as procedures and functions can be implemented together with separate software modules each of which performs at least one of functions and operations. The software codes can be implemented with a software application written in any suitable programming language. Also, the software codes can be stored in the memory and executed by the controller, thus making the controller a type of special purpose controller specifically configured to carry out the described functions and algorithms. Thus, the components shown in the drawings have sufficient structure to implement the appropriate algorithms for performing the described functions.

Although the embodiments of the present disclosure have been described in detail with reference to the accompanying drawings, the present disclosure is not limited thereto and can be embodied in many different forms without departing from the technical concept of the present disclosure. Therefore, the embodiments of the present disclosure are provided for illustrative purposes only but not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A foldable display device, comprising:
a first support plate;
a second support plate;
a display panel disposed on the first support plate and the second support plate; and
a hinge assembly disposed between the first support plate and the second support plate, the hinge assembly including:
a first hinge arm;
a second hinge arm rotatably connected to the first hinge arm;
a first bevel gear coupled to the first hinge arm;
a second bevel gear coupled to the second hinge arm;
a first gear arm interlocked with the first hinge arm; and
a second gear arm interlocked with the second hinge arm,
wherein the display panel performs a folding operation and an unfolding operation about a rotation axis different from central axes of the first bevel gear and the second bevel gear,
wherein the first bevel gear meshes with the second bevel gear to synchronize movement of the first hinge arm and the second hinge arm, and
wherein each of the first hinge arm and the second hinge arm includes a first idle gear.

2. The foldable display device of claim 1, wherein each of the first bevel gear and the second bevel gear includes a second idle gear that meshes with a respective one of the first idle gears of the first hinge arm and the second hinge arm, and
wherein the first idle gears are disposed in a direction perpendicular to the second idle gears.

3. The foldable display device of claim 1, further comprising:
a first shaft rotatably coupled to the first gear arm; and
a second shaft rotatably coupled to the second gear arm.

4. The foldable display device of claim 3, further comprising:
a first cam seated on the first shaft;
a first compression spring provided on an outer surface of the first shaft between the first cam and the first gear arm;
a second cam seated on the second shaft; and
a second compression spring provided on an outer surface of the second shaft between the second cam and the second gear arm.

5. The foldable display device of claim 4, wherein each of the first cam and the second cam includes a body and a first detent provided on one surface of the body, and
wherein each of the first gear arm and the second gear arm includes a second detent that is engaged by the first detent of a respective one of the first cam and second cam.

6. The foldable display device of claim 1, further comprising:
a hinge housing;
an inner frame disposed between the hinge housing and each of the first hinge arm and the second hinge arm; and
a hinge support disposed on the inner frame between the first gear arm and the second gear arm and extending along a longitudinal direction of the inner frame.

7. The foldable display device of claim 6,
wherein when the display panel is folded, the hinge support descends to form an escape space for supporting a curved portion of the display panel, and when the display panel is unfolded, the hinge support rises to support the display panel.

8. The foldable display device of claim 7, further comprising:
a first lift bump protruding from an inner end of the first gear arm; and
a second lift bump protruding from an inner end of the second gear arm,
wherein when the display panel is unfolded, the first and second lift bumps move from a lower portion to an upper portion simultaneously with unfolding of the first gear arm and the second gear arm, and lift protruding upper ends of the hinge support to raise the hinge support.

9. The foldable display device of claim 8,
wherein the hinge support includes a compression spring, and
wherein when the display panel is folded, the lift bumps move downward, and the hinge support descends by the restoring force produced by the compression spring of the hinge support, so that the escape space is formed.

10. The foldable display device of claim 6, further comprising:
a pair of guide pins provided on an upper end of the inner frame and protruding toward the first hinge arm and the second hinge arm; and
a pair of housing cover rails provided on the first hinge arm and the second hinge arm facing the pair of guide pins, and the pair of guide pins being fitted to the pair of housing cover rails,
wherein the first hinge arm and the second hinge arm are rotated along a folding trajectory of the housing cover rails while being guided by the pair of guide pins.

11. The foldable display device of claim 6, further comprising:
a compression spring supporting the hinge support;
a magnetic sheet attached to a rear surface of the display panel; and
a magnet disposed in an inner space of the hinge support facing the magnetic sheet,
wherein when the display panel is folded, the magnet is magnetically coupled to the magnetic sheet.

12. The foldable display device of claim 1,
wherein each of the first gear arm and the second gear arm includes a sliding pin protruding towards a respective one of the first hinge arm and the second hinge arm,
wherein each sliding pin moves along a sliding space provided in the respective one of first hinge arm and the second hinge arm during the folding operation and the unfolding operation.

13. A foldable display device, comprising:
a support plate having a groove formed along a longitudinal axis of the support plate;
a hinge assembly disposed in the groove of the support plate and attached to the support plate, the hinge assembly including:
a first hinge arm;

a second hinge arm rotatably connected to the first hinge arm;
a first gear arm interlocked with the first hinge arm; and
a second gear arm interlocked with the second hinge arm; and
a display panel disposed on a top surface of the support plate and configured to fold about the hinge assembly,
wherein each of the first gear arm and the second gear arm includes a sliding pin protruding towards a respective one of the first hinge arm and the second hinge arm, and
wherein each sliding pin moves along a sliding space provided in the respective one of first hinge arm and the second hinge arm during a folding operation and an unfolding operation of the display panel.

14. The foldable display device of claim 13, further comprising:
a first bevel gear coupled to the first hinge arm; and
a second bevel gear coupled to the second hinge arm and meshing with the first bevel gear to synchronize movement of the first hinge arm and the second hinge arm.

15. The foldable display device of claim 14, wherein each of the first hinge arm and the second hinge arm includes a first idle gear, and
wherein each of the first bevel gear and the second bevel gear includes a second idle gear that meshes with a respective one of the first idle gears.

16. The foldable display device of claim 14, further comprising:
a first shaft rotatably supporting to the first gear arm;
a second shaft rotatably supporting to the second gear arm;
a first cam seated on the first shaft;
a first compression spring provided between the first cam and the first gear arm;
a second cam seated on the second shaft; and
a second compression spring provided between the second cam and the second gear arm, and
wherein the first cam and the second cam produce a frictional force to maintain the foldable display device in one of a folded state and an un-folded state.

17. The foldable display device of claim 16, wherein each of the first cam and the second cam includes a body and a first detent provided on one surface of the body, and
wherein each of the first gear arm and the second gear arm includes a second detent that is engaged by the first detent of a respective one of the first cam and the second cam.

18. The foldable display device of claim 16, further comprising:
a hinge housing;
an inner frame vertically disposed between the hinge housing and each of the first hinge arm and the second hinge arm; and
a hinge support disposed on the inner frame between the first gear arm and the second gear arm.

19. The foldable display device of claim 18, wherein the hinge support includes a third compression spring, and
wherein when the display panel is folded, the hinge support descends by a restoring force produced by the third compression spring into a space for supporting a curved portion of the display panel, and when the display panel is unfolded, the hinge support rises to support the display panel.

* * * * *